(12) United States Patent
Sato et al.

(10) Patent No.: US 6,581,584 B2
(45) Date of Patent: Jun. 24, 2003

(54) IGNITION CONTROL SYSTEM FOR INTERNAL COMBUSTION ENGINE

(75) Inventors: Norio Sato, Numazu (JP); Kenji Kimura, Numazu (JP); Takahiro Osada, Numazu (JP)

(73) Assignee: Kokusan Denki Co., Ltd., Numazu (JP)

( * ) Notice: Subject to any disclaimer, the term of this patent is extended or adjusted under 35 U.S.C. 154(b) by 223 days.

(21) Appl. No.: 09/859,695

(22) Filed: May 17, 2001

(65) Prior Publication Data

US 2001/0042542 A1 Nov. 22, 2001

(30) Foreign Application Priority Data

May 18, 2000  (JP) ........................................ 2000-146271

(51) Int. Cl.[7] .................................................. F02P 1/00
(52) U.S. Cl. .................................. 123/599; 123/406.56
(58) Field of Search ............................. 123/599, 406.56

(56) References Cited

U.S. PATENT DOCUMENTS 5,069,193 A * 12/1991 Erhard ........................ 123/599
5,265,573 A * 11/1993 Imoli ....................... 123/406.56
5,931,137 A * 8/1999 McLeod et al. ......... 123/406.57
5,992,380 A * 11/1999 Inagaki ..................... 123/406.56

FOREIGN PATENT DOCUMENTS

| JP | 26602/1995 (H07) | 3/1995 |
|---|---|---|
| JP | 2797408 | 7/1998 |

* cited by examiner

*Primary Examiner*—Erick Solis
(74) *Attorney, Agent, or Firm*—Pearne & Gordon LLP

(57) ABSTRACT

An ignition control system for an internal combustion engine comprising a signal generator to generate pulse signals at a peculiar rotation angle position of the internal combustion engine and a position detection circuit to output a position detection signal whenever a zero cross point of a waveform of an output from a magneto AC generator driven by the engine is detected whereby when the engine should start, the engine is ignited as the signal generator generates the pulse signal, when the engine is idling, it is ignited as the position detection circuit outputs the position detection signal during the period after the pulse signal is generated and before the next pulse signal is generated and in the area exceeding the idling rotational speed, it is ignited at the ignition position arithmetically operated by a microcomputer.

10 Claims, 13 Drawing Sheets

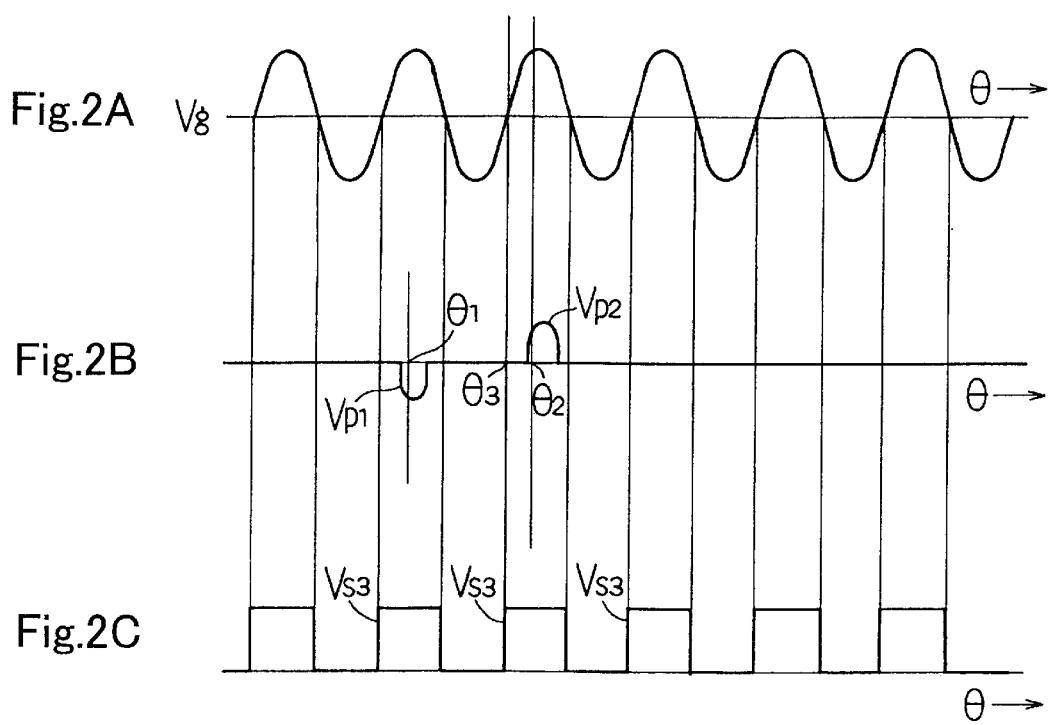
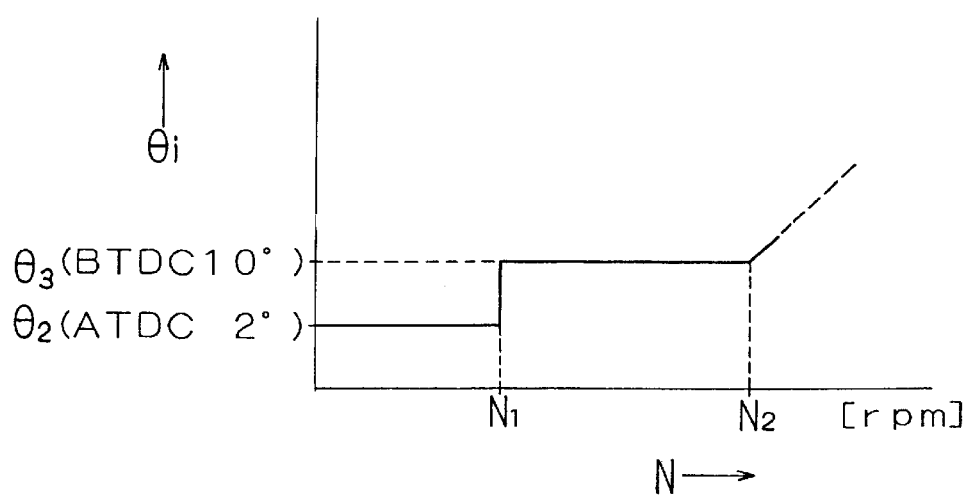

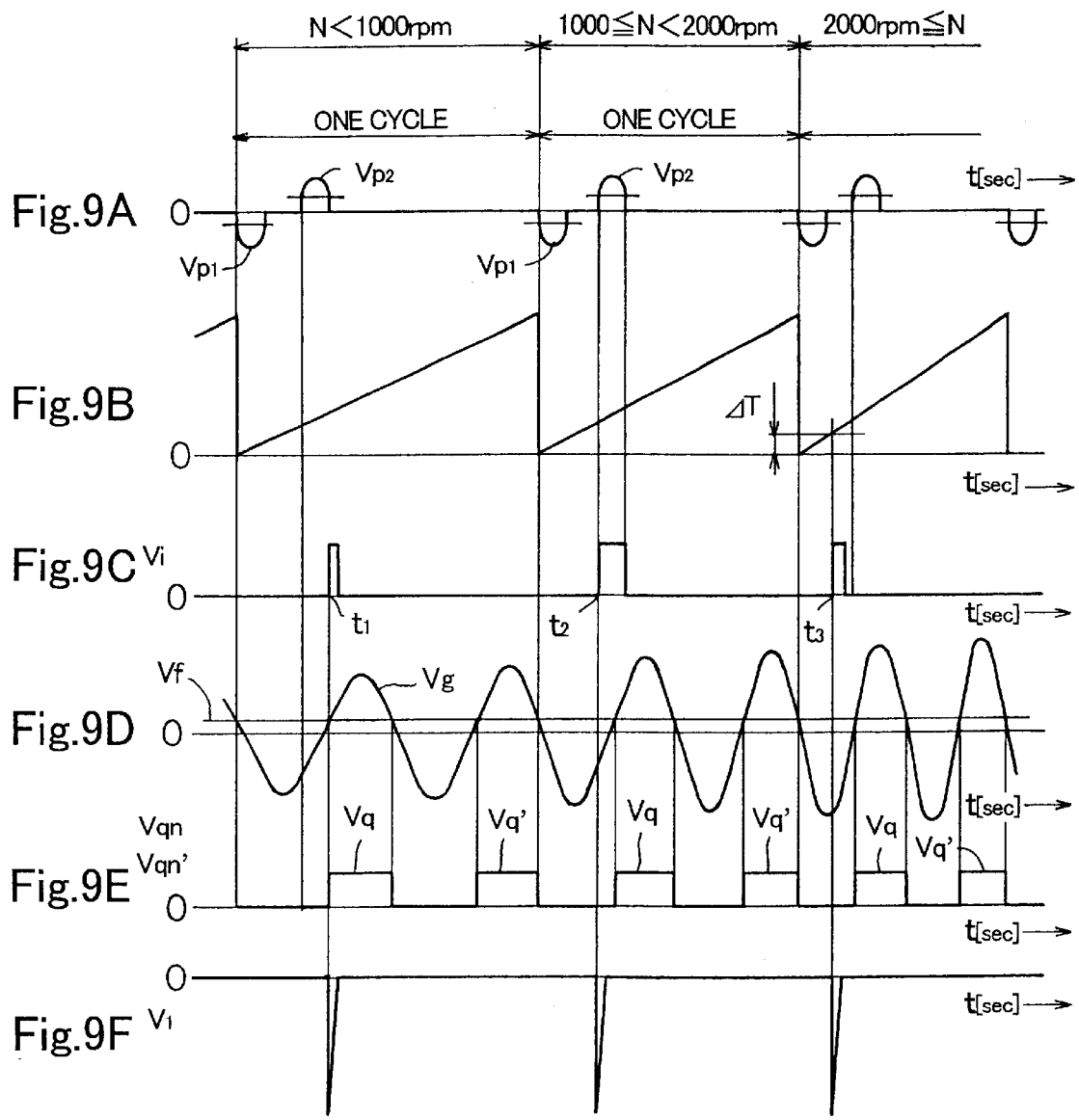

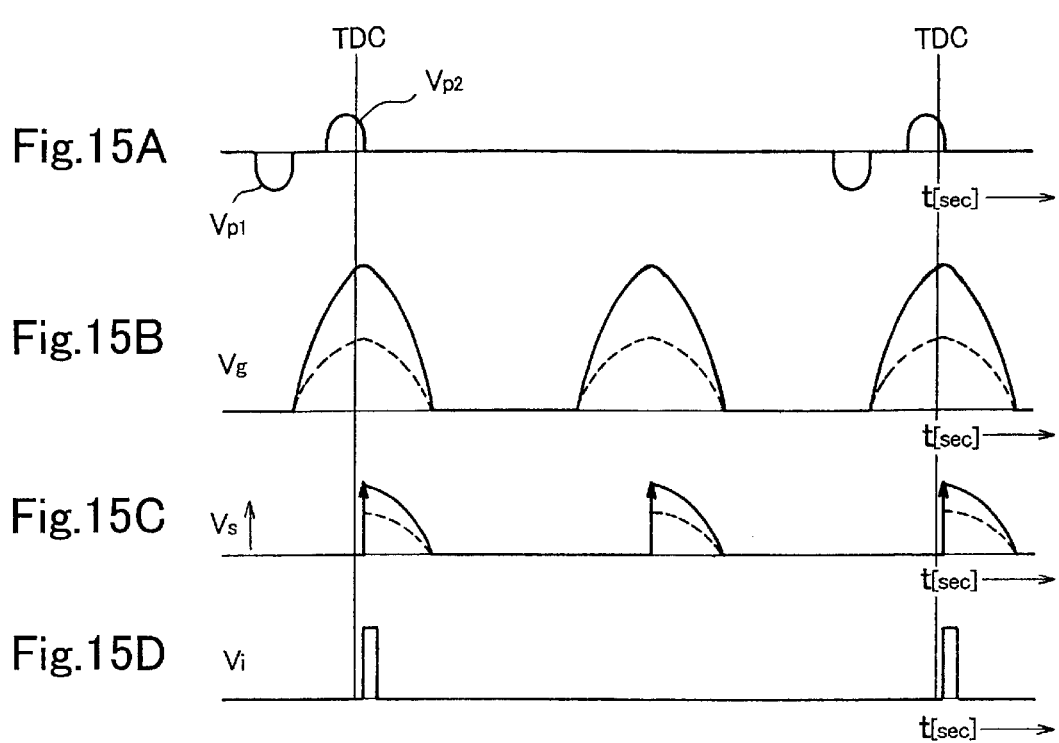
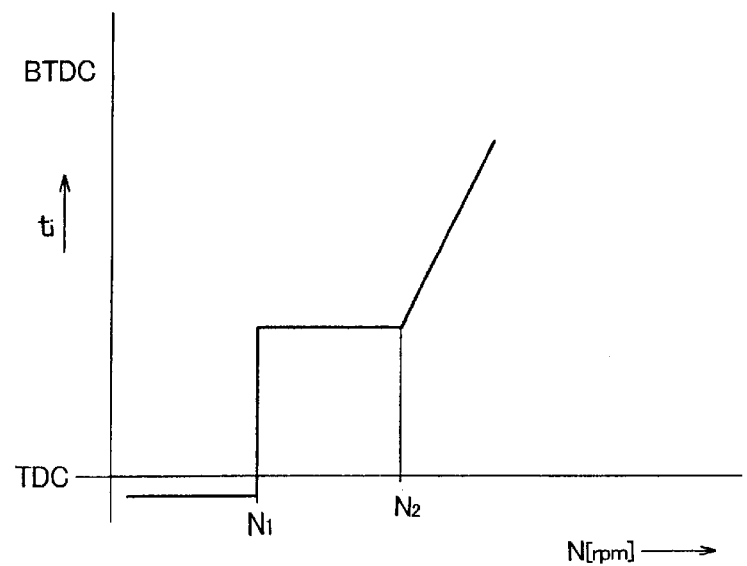

Fig.18A
Fig.18B
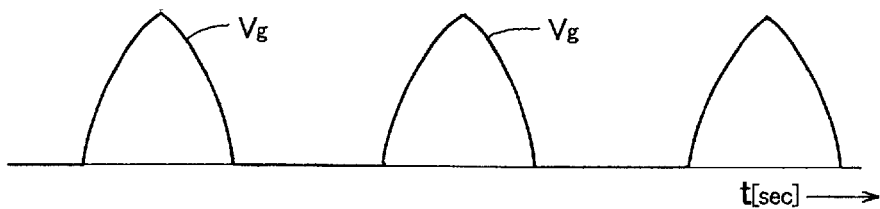
Fig.18C $V_s$
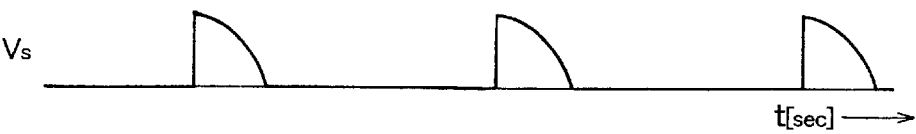
Fig.18D $V_{i1}$

IGNITION CONTROL SYSTEM FOR INTERNAL COMBUSTION ENGINE

TECHNICAL FIELD OF THE INVENTION

This invention pertains to a method of controlling an ignition position of an internal combustion engine and an ignition control system for practicing the ignition control method.

BACKGROUND OF THE INVENTION

An ignition system for an internal combustion engine comprises an ignition circuit to generate an igniting high voltage in a secondary coil of an ignition coil by controlling a primary current of the ignition coil and an ignition control system to control a rotation angle position (an ignition position) where an ignition signal is applied to the ignition circuit.

The ignition control system comprises low speed ignition position control means to control the ignition position of the internal combustion engine so as to ignite the engine when it is detected that the rotation angle position of a crankshaft of the engine is coincident with a peculiar rotation angle position predetermined in accordance with the rotational speed of the engine and steady-state ignition position control means to control the ignition position of the internal combustion engine so as to ignite the engine when the ignition position arithmetically operated under the control condition of at least the rotational speed of the engine. The ignition position of the engine is determined by the low speed ignition position control means when the engine should start or is rotating at the rotational speed of a set value or less than and by the steady-state ignition position control means when the engine is rotating at the rotational speed exceeding the set value.

On the internal combustion engine, a signal generator device is mounted to obtain an engine information such as a rotational speed information and a rotation angle information. The signal generator device comprises a conventional inductor type generator which generates a first pulse signal at a first rotation angle position set at a position advanced relative to a top dead center of the engine corresponding to the rotation angle position of the crankshaft when the piston reaches the top dead center and generates a second pulse signal at a second rotation angle position set at a position delayed relative to the first rotation angle position.

The first rotation angle position is normally set at the maximum advanced position of the ignition of the engine or at the position further advanced relative to the maximum advanced position and the measurement of the ignition position is made with the first rotation angle position as the reference position. The second rotation angle position is set at the position suitable for the low speed ignition position.

In the conventional ignition control apparatus, the low speed ignition position control means is adapted to apply the ignition signal to the ignition circuit when the aforementioned signal generator device generates the second pulse signal at the second rotation angle position suitable for the low speed ignition position.

The steady-state ignition position control means comprises ignition position arithmetical operation means to arithmetically operate the ignition position by obtaining the rotational speed information of the engine and the rotation angle information thereof from the signal generated at the steady position by the signal generator device mounted on the engine, for example and ignition signal generation means to start the measurement of the ignition position which is obtained by the arithmetical operation when the signal generator device generates the peculiar signal and to generate the ignition signal when the measurement of the ignition position is completed (when it is detected that the rotation angle position of the crankshaft of the engine is coincident with the ignition position obtained by the arithmetical operation). These means may be accomplished by practicing a predetermined program in a microcomputer, for example.

It will be considered that the ignition position may be controlled so as to ignite the engine at the ignition position given by the arithmetical operation by using the rotation information obtained from the output of the signal generator device. However, the rotation information cannot be positively obtained from the signal generated by the signal generator device because of the fine variation in the rotational speed of the crankshaft caused by the variation in stroke of the engine due to the unsteady rotation of the engine when the engine should start or while the engine is rotating at the low speed. Thus, it is hard that the low speed ignition position is accurately obtained and if the engine tried to be ignited at the arithmetically operated ignition position, the rotation of the engine gets further unsteady. Thus, when the engine is rotating at the low speed, it has been ignited not by the arithmetically operated ignition position, but by the signal generated at the rotation angle position predetermined by the signal generator device.

In some cases, the ignition position of the engine is advanced relative to the top dead center when the engine should start, it will fail to start due to the phenomena that the piston of the engine is forced backward when the engine is ignited. Therefore, the engine is required to be ignited at the position fully delayed relative to and closer to the top dead center.

However, as the low speed ignition position is set to be fully delayed relative to the top dead center to prevent the piston of the ignited engine from being forced backward, in some cases, the idling rotation of the engine tends to be unsteady due to the excessive delay of the ignition position when the engine reaches the idling rotational speed after it starts.

In some internal combustion engines, for instance, the appropriate ignition position when the engine should start is a position delayed by 2 degrees relative to the top dead center while the appropriate ignition position in the idling condition is a position advanced by 10 degrees relative to the top dead center. In this case, if the low speed ignition position is set at the position where it is delayed by 2 degrees relative to the top dead center in view of the good startability of the engine, then the idling rotation of the engine cannot be made in a steady manner.

Although it is considered that the idling ignition position is determined by the arithmetical operation, it cannot be arithmetically operated in a positive manner due to fine variation of the rotational speed of the engine as aforementioned and therefore the rotation of the engine cannot be made in a steady manner even though it is ignited at the arithmetically operated ignition position.

Although it will be considered that three or more than three signals are generated at different positions by the signal generator device and the starting and idling ignition positions may be determined by using these signals from the signal generator device, the construction of the signal generator device for generating three or more than three signals will be complicated.

SUMMARY OF THE INVENTION

Accordingly, it is a principal object of the invention to provide an ignition control method for an internal combustion engine adapted to set the appropriate ignition positions when the engine should start and when it rotates at the low speed.

It is another object of the invention to provide an ignition control system for an internal combustion engine adapted to set the appropriate ignition positions when the engine should start and when it rotates at the low speed.

In order to accomplish the object of the invention, the present invention is provided with a signal generator device to generate a first pulse signal at a first rotation angle position set at a position advanced relative to a top dead center of an internal combustion engine and a second pulse signal at a second rotation angle position set at a position delayed relative to the first rotation angle position and a position detection circuit to output a position detection signal whenever a peculiar or specific point of a waveform of an output from a generation coil of a magneto AC generator driven by the engine and a phase relation between the output of the signal generator device and the output of the generation coil is so set as that the position detection signal is generated at least once between the first and second rotation angle positions.

The ignition control system of the invention controls the ignition system of the engine so that while the rotational speed of the engine is lower than a set value, the engine is ignited when one selected among the second pulse signal and the position detection signal is generated and so that while the rotational speed of the engine exceeds the set value, the engine is ignited at the rotation angle position arithmetically operated under the control condition including the rotational speed of the internal combustion engine.

What is meant by "the peculiar point of the waveform of the output from the generation coil of the magneto AC generator" is the point apparently distinguishable from the other points which may be a zero cross point or a peak point, for example. In case that the position detection signal is generated when the peak point of the output voltage of the magneto AC generator is detected, a peak detection circuit may be used for the position detection circuit. In case that the position detection signal is generated when the zero cross point of the output voltage of the magneto AC generator is detected, a zero cross detection circuit may be used for the position detection circuit.

Since the position detection circuit generates the position detection signal whenever the peculiar point of the waveform of the voltage from the generation coil is detected, a plural of position detection signals are generated every one revolution of the crankshaft of the engine, but since the invention uses the position detection signal generated after the signal generator device generates the first signal, for the signal determining the low speed ignition position, the position detection signal used for determining the low speed ignition position can be easily distinguished among the plural of the position detection signals generated per one revolution.

As aforementioned, as the rotation angle position information of the engine is obtained from the waveform of the output of the magneto AC generator driven by the internal combustion engine as well, a plural of signals used for determining the starting ignition position and the low speed ignition position can be generated without any complicated construction of the signal generator device and therefore the low speed ignition position can be positively controlled.

BRIEF DESCRIPTION OF THE DRAWINGS

The above and other objects and features of the invention will be apparent from the detailed description of the preferred embodiments of the invention, which are described and illustrated with reference to the accompanying drawings, in which;

FIGS. 2A through 2C illustrate waveforms of voltages at various portions of the ignition control system of FIG. 1;

FIG. 3 illustrates an example of the ignition characteristic obtained by the ignition control system of FIG. 1;

FIGS. 9A through 9F illustrate timing charts for explanation of the operation of the ignition control system of FIG. 8;

FIGS. 15A through 15D illustrate timing charts for explanation of the operation of the ignition control system of FIG. 14;

FIG. 16 illustrates an example of the ignition characteristic obtained by the ignition control system of FIG. 14;

and FIGS. 18A through 18D illustrate timing charts for explanation of the operation of the ignition control system of FIG. 17.

DETAILED DESCRIPTION OF PREFERRED EMBODIMENTS

Figure 1:
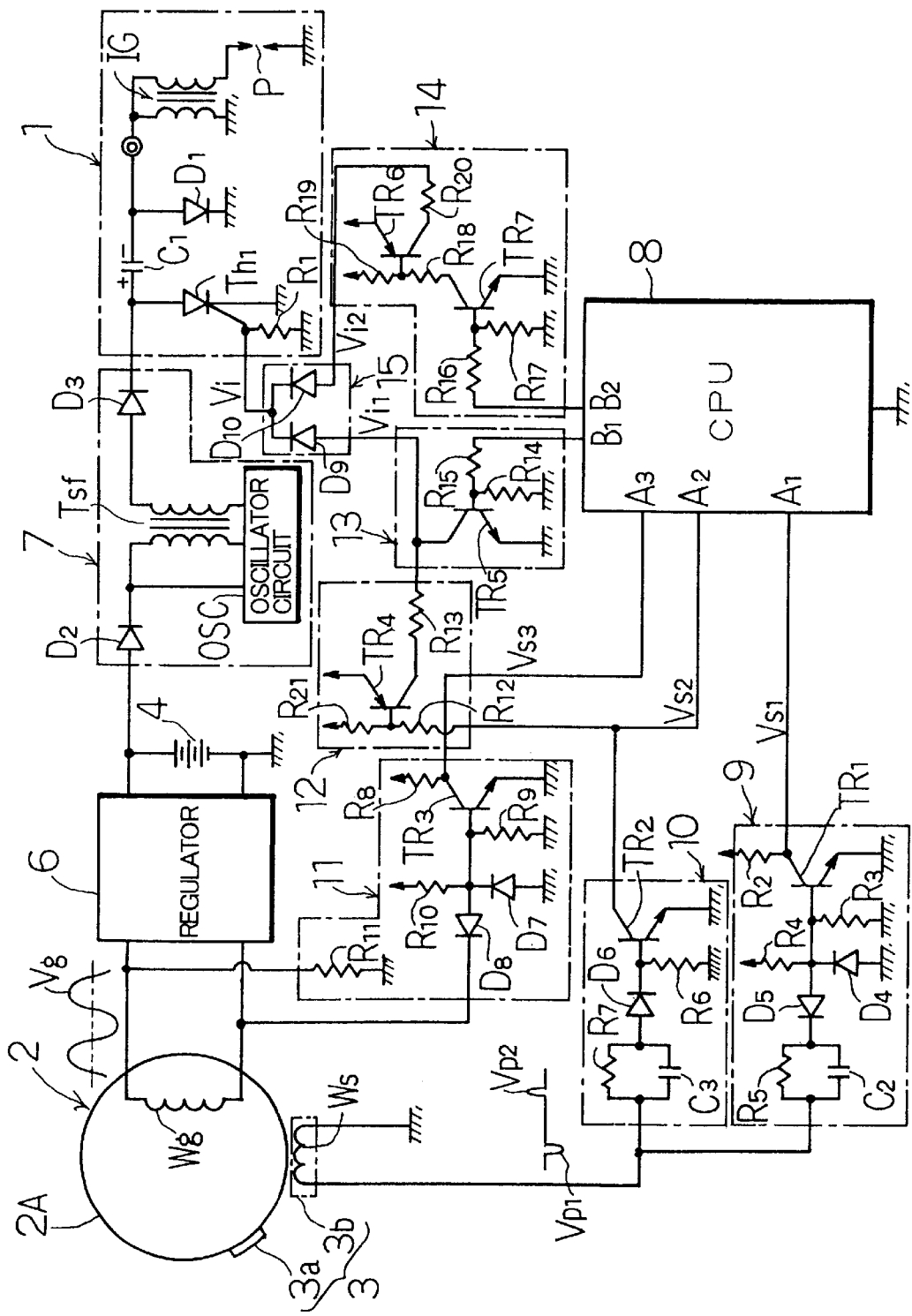
FIG. 1 is a schematic diagram of an ignition control system for an internal combustion engine constructed in accordance with an embodiment of the invention.

Referring now to FIG. 1, there is shown an ignition control system for an internal combustion engine constructed in accordance with one embodiment of the invention. There are illustrated in FIG. 1 an ignition circuit 1, a magneto AC generator 2 driven by the internal combustion engine and a signal generator 3 to generate first and second signals Vp1 and Vp2 giving peculiar rotation angle position information of the internal combustion engine.

A battery 4 is charged by an output voltage of a battery charging generation coil Wg provided within the magneto AC generator 2 through a regulator 6. A DC—DC converter 7 boosts the output voltage of the battery 4 to generate an electric power source voltage, which is given the ignition circuit 1. A CPU 8 of a microcomputer is used for operating the ignition control system of the invention.

In the illustrated embodiment, a signal generator device comprises the signal generator 3 and first and second waveform shaping circuits 9 and 10 serving to convert the first and second pulse signals Vp1 and Vp2 generated by the signal generator 3 into first and second signals Vs1 and Vs2 each having a waveform which can be recognized by the CPU 8 and apply them to ports A1 and A2 thereof, respectively.

A position detection circuit 11 serves to generate a position detection signal Vs3 when the zero cross point of the output voltage Vg of the generation coil Wg is detected. The position detection signal Vs3 is applied to a port A3 of the CPU 8.

A starting ignition signal output circuit 12 serves to output a starting ignition signal Vi1 when the signal generator 3 generates the second pulse signal Vp2 and the waveform shaping circuit 10 generates the second signal Vs2. A starting ignition signal output prohibition circuit 13 prohibits the output of the starting ignition signal Vi1 by shorting output terminals of the starting ignition signal output circuit 12 when the rotational speed of the engine exceeds a first set value and the CPU 8 outputs a prohibition signal from a port B1 thereof.

A non-starting ignition signal output circuit 14 serves to output a non-starting ignition signal Vi2 when an ignition command signal is generated at an idling ignition position and at a steady-state ignition position where the engine is operated at a speed exceeding the idling rotational speed. An OR circuit 15 serves to apply an ignition signal Vi to the ignition circuit 1 when either of the starting ignition signal Vi1 and the non-starting ignition signal Vi2 is generated.

The illustrated ignition circuit 1 may be of a conventional capacitor discharging type circuit which may comprise an ignition coil IG having a primary coil with one end grounded to earth and a secondary coil with one end connected commonly to the other end of the primary coil, an igniting capacitor C1 having one end connected to the other end of the primary coil of the ignition coil IG, a thyristor Th1 connected between the other end of the capacitor C1 and the ground with a cathode of the thyristor faced to the ground side, a diode D1 connected in parallel to the primary coil of the ignition coil IG with a cathode of the diode D1 faced to the ground side, a resistor R1 connected between the gate and the cathode of the thyristor Th1 and an ignition plug P mounted on a not shown cylinder of the internal combustion engine and connected to the secondary coil of the ignition coil IG.

When the ignition signal Vi is applied to the ignition circuit, the thyristor Th1 is turned on and the charge charged in the capacitor C1 is discharged through the primary coil of the ignition coil IG. Since the large primary current abruptly flows through the ignition coil because of the discharge of the capacitor, an igniting high voltage is induced across the secondary coil of the ignition coil IG. The high voltage causes the ignition plug P to be sparked so that the engine is ignited.

The magneto AC generator 2 may comprise a flywheel magnet rotor 2A mounted on the crankshaft of the engine and a stator including an armature core having magnetic poles faced to a magnet field of the magnet rotor 2A and a plural of generation coils wound on the armature core. In the illustrated embodiment, one of the generation coils on the stator may be used as the battery charging generation coil Wg. An example of the waveform of the AC voltage Vg output by the generation coil Wg is shown in FIG. 2A.

The signal generator 3 may comprise a rotor formed by a reluctor 3a provided on a periphery of the flywheel of the magneto AC generator 2 and a signal generation stator 3b to generate the first and second pulse signals Vp1 and Vp2 when the front and rear edges of the reluctor 3a as viewed in the rotational direction are detected, respectively. The signal generation stator 3b comprises a core having a magnetic pole provided at its leading end so as to be faced to the reluctor 3a, a signal coil Ws wound on the core and a permanent magnet magnetically bonded to the core. The signal coil Ws generates the first and second pulse signals Vp1 and Vp2 of different polarities when the reluctor 3a begins and ends to be faced to the magnetic pole of the core of the signal generation stator.

Examples of the waveforms of the first and second pulse signals Vp1 and Vp2 are shown in FIG. 2B. In the embodiment, the first pulse signal Vp1 is of negative pulse while the second pulse signal is of positive pulse. The position where the first pulse signal Vp1 is generated is set at a first rotation angle position θ1 further advanced relative to the maximum advanced ignition position of the engine while the position where the second pulse signal Vp2 is generated is set at a second rotation angle position θ2 suitable for the starting ignition position of the engine.

The regulator 6 comprises a rectifier to rectify the AC voltage Vg of general sine wave output by the generation coil Wg and a control circuit to control the output of the rectifier to be kept at a constant value. The battery 4 is charged by the voltage applied through the regulator 6 from the generation coil Wg.

The DC—DC converter 7 comprises a boosting transformer Tsf to which the output voltage of the battery 4 is applied through a diode D2 and an oscillator circuit OSC to intermit the primary current supplied from the battery 4 to the primary coil of the transformer Tsf. The output voltage of 12V from the battery 4 is boosted by the transformer Tsf and the voltage of 200V or more than is induced across the secondary coil of the transformer Tsf. The voltage obtained across the secondary coil of the boosting transformer Tsf is applied through the diode D3 across both ends of the series circuit of the igniting capacitor C1 and the primary coil of the ignition coil IG. The igniting capacitor C1 is charged by the output voltage of the DC—DC converter 7 with the polarity illustrated in FIG. 1.

The first waveform shaping circuit 9 comprises a NPN transistor TR1, resistors R2 through R5, diodes D4 and D5 and a capacitor C2. When the first pulse signal of negative polarity generated by the generation coil Ws exceeds a voltage or threshold voltage across the capacitor C2, the current flows from the generation coil Ws through the diode D4, the diode D5 and the resistor R5 again to the generation coil Ws whereby a voltage drop occurs across the both ends of the diode D4. Since the voltage drop causes the base and the emitter of the transistor TR1 to be biased in a reverse direction, the transistor TR1 is in the off-state while the pulse signal Vp1 is exceeding the threshold value. Thus, there is obtained at the collector of the transistor TR1 the first signal Vs1 of pulse waveform which is in the high level condition while the pulse signal Vp1 is exceeding the threshold value. The CPU 8 detects that the rotation angle position of the crankshaft of the engine reaches the first rotation angle position θ1 when the first signal Vs1 is generated.

The second waveform shaping circuit 10 comprises a NPN transistor TR2, resistors R6 and R7, a capacitor C3 and a diode D6. When the second pulse signal Vp2 generated by the generation coil Ws is exceeding a voltage or threshold voltage across the capacitor C3, the base current flows through the transistor TR2 so that it is turned on. The second signal Vs2, which gets the zero level while the transistor TR2 is being conducted, is obtained at the collector thereof. The CPU 8 detects that the rotation angle position of the crankshaft of the engine reaches the second rotation angle position θ2 suitable for the starting ignition position of the engine which corresponds to the position delayed by 2 degrees relative to the top dead center of the engine when the second signal Vs2 is generated.

The position detection circuit 11 comprises a zero cross detection circuit including a NPN transistor TR3, resistors R8 through R11 and diodes D7 and D8. In the position detection circuit, when the generation coil Wg generates the voltage of positive half wave, the current flows from the generation coil Wg through the resistor R11, the diode D7 and the diode D8 again to the generation coil Wg whereby a voltage drop occurs across the diode D7. Since the voltage drop causes the emitter and the base of the transistor TR3 to be biased in a reverse direction, the transistor TR3 is turned off. Since the current never flows through the diode D7 while the generation coil Wg is generating the voltage of negative half wave, the transistor TR3 is turned on because the base current flows through the resistor R10 from a not shown DC power source circuit which output a constant DC voltage with the battery 4 used as the power source. Thus, as shown in FIG. 2C, at the collector of the transistor TR3 is obtained a rectangular wave signal which is kept at a high level while the generation coil Wg is generating the voltage of positive half wave and at an approximate zero level while the generation coil Wg is generating the voltage of negative half wave. The rectangular wave signal is a signal which rises up at the zero cross point when the output voltage of the generation coil Wg rises up from the negative half wave to the positive half wave and drops down when the output voltage of the generation coil Wg drops down at the zero cross point from the positive half wave to the negative half wave. The CPU 8 recognizes the rising up of the signal from the zero level to the high level for the position detection signal Vs3 and obtains the rotation angle position information of the engine.

In the invention, a phase relation between the output of the signal generation device and the generation coil Wg is so set that at least one position detection signal Vs3 is generated between the first and second rotation angle positions θ1 and θ2 and the phase of the output of the generation coil Wg is so adjusted that the position detection signal Vs3 output by the position detection circuit 11 between the first and second rotation angle positions θ1 and θ2 is generated at the ignition position for the peculiar rotation area such as a low speed area of the engine which will normally correspond to the idling ignition position.

In the illustrated embodiment, the phase relation between the output of the signal generation device and the generation coil Wg is so set that a single position detection signal Vs3 is generated between the first and second rotation angle positions θ1 and θ2 and the phase of the output of the generation coil Wg is so adjusted that the position detection signal Vs3 output by the position detection circuit 11 between the first and second rotation angle positions θ1 and θ2 is generated at the ignition position suitable for the idling ignition position which corresponds to the position advanced by 10 degrees relative to the top dead center in the illustrated embodiment. The phase of the output of the generation coil Wg is adjusted by controlling the position where the stator of the magneto AC generator 2 is mounted.

The starting ignition signal output circuit 12 comprises a PNP transistor TR4 and resistors R12, R13 and R21. The transistor TR4 is turned on when the second pulse signal Vp2 is generated at the starting ignition position of the engine to turn on the transistor TR2 of the second waveform shaping circuit 10. Thus, the starting ignition signal Vi1 is output from the not shown power source circuit through the resistor R13.

The starting ignition signal output prohibition circuit 13 comprises a NPN transistor TR5 and resistors R14 and R15. The transistor TR5 is turned on when the rotational speed of the engine exceeds the first set value to output the prohibition signal from its port B1 of the CPU 8. Thus, the output terminals of the starting or low speed ignition signal output circuit 12 is shorted whereby the low speed ignition signal Vi1 is prohibited from being output.

The non-starting ignition signal output circuit 14 comprises a PNP transistor TR6, a NPN transistor TR7 and resistors R16 through R20. The transistors TR6 and TR7 are turned on when the CPU 8 detects the idling ignition position and at the steady-state ignition position to output the ignition command signals from its port B2. Thus, the non-starting ignition signal Vi2 is output from the not shown DC power source circuit through the emitter and collector of the transistor TR6 and the resistor R20.

The OR circuit 15 comprises diodes D9 and D10 having cathodes connected commonly to the gate of the thyristor Th1. The starting ignition signal Vi1 and the non-starting ignition signal Vi2 are input to the ignition circuit 1 through the diodes D9 and D10, respectively.

Flow charts illustrating an example of an algorithm of a program practiced by the CPU 8 of the ignition control system of FIG. 1 are shown in FIGS. 4 through 7.

Figure 4:
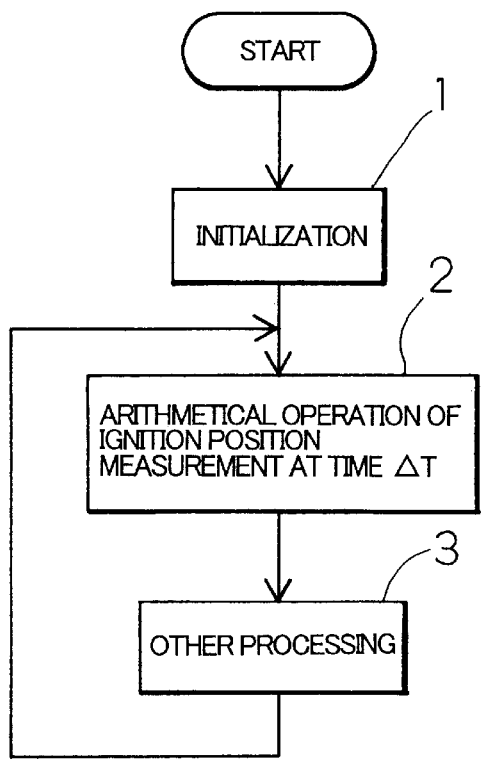
FIG. 4 is a flow chart illustrating an example of an algorithm of a main routine of a program practiced by a CPU of the ignition control system of FIG. 1.

A main routine is shown in FIG. 4. The main routine starts when the output of the power source is applied to the CPU 8. In the main routine, in the step 1, various portions of the control system are initialized. In the step 2, the ignition position is arithmetically operated relative to the rotational speed of the engine and, in the step 3, other processing required is made. The arithmetical operations of the ignition positions are made by using a map for arithmetically operating the ignition positions, which are stored by a ROM of the microcomputer. The map for arithmetically operating the ignition positions provides the relation between the rotational speed of the engine and the ignition position thereof.

Figure 5:
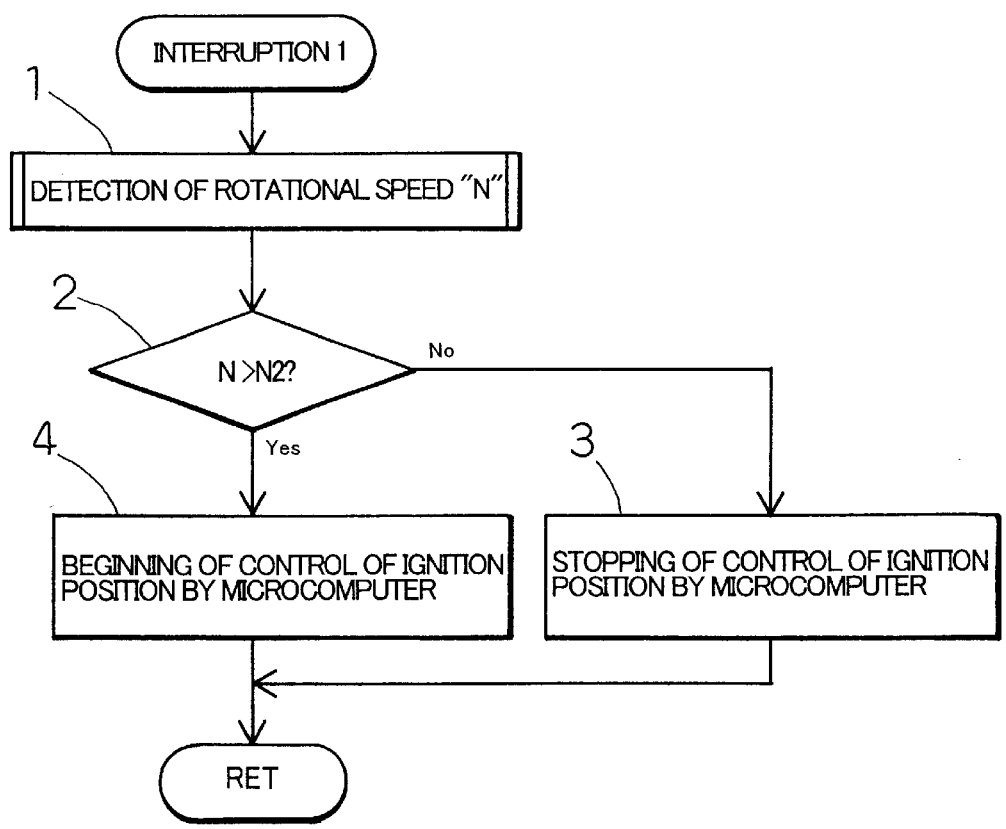
FIG. 5 is a flow chart illustrating an example of an algorithm of an interruption routine of the program practiced by the CPU of the ignition control system of FIG. 1 when a signal generator device outputs a first pulse signal.

As the first signal Vs1 is applied from the first waveform shaping circuit 9 to the port A1 of the CPU 8, an interruption routine of FIG. 5 is practiced. In the interruption routine, in the step 1, the rotational speed of the engine is arithmetically operated. The rotational speed N is arithmetically operated from the time after the preceding first signal Vs1 is input until the present first signal Vs1 is input which corresponds to the time taken for one revolution of the crankshaft.

After the rotational speed of the engine is arithmetically operated, it is judged whether the rotational speed N arithmetically operated in the step 2 exceeds the second set value N2. As the result of the judgment, when it is judged that the rotational speed does not exceeds the second set value set at a value equal to the rotational speed providing the upper limit of the idling area, the operation is advanced to the step 3 where the control of the ignition position by the microcomputer is stopped to be returned to the main routine. In the step 2, when it is judged that the rotational speed exceeds the second set value, the operation is advanced to the step 4 where the control of the ignition position by the microcomputer begins and then the operation is returned to the main routine.

Figure 6:
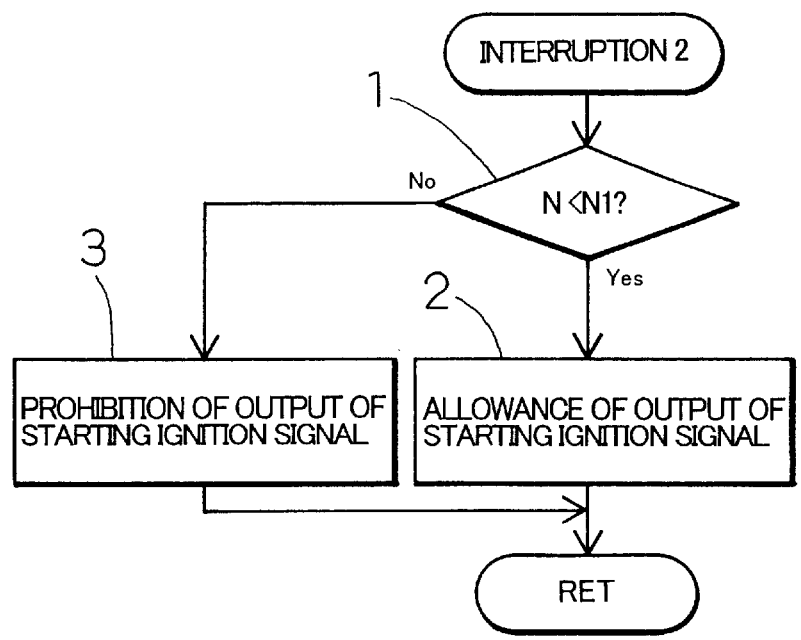
FIG. 6 is a flow chart illustrating an example of an algorithm of an interruption routine of the program practiced by the CPU of the ignition control system of FIG. 1 when the signal generator device outputs a second pulse signal.

As the second signal Vs2 is applied from the second waveform shaping circuit 10 to the port A2 of the CPU 8, an interruption routine of FIG. 6 is practiced. In the step 1 of this interruption routine, it is judged whether the rotational speed N of the engine is lower than the first set value N1 set at a value equal to the minimum speed of the idling area or not. As the result of the judgment, while the rotational speed is lower than the first set value N1, the operation is advanced to the step 2 where the prohibition signal stops being output from the port B1 of the CPU 8. This allows the ignition signal to be applied from the starting ignition signal output circuit to the ignition circuit 1 and the operation is returned to the main routine. Thus, while the rotational speed of the engine is lower than that providing the minimum value of the idling area, the ignition circuit 1 makes the ignition operation when the starting ignition signal Vi1 is generated.

As, it is judged in the step 1 of the interruption routine of FIG. 6 that the rotational speed N is higher than the first set value N1, the operation is advanced to the step 3 where the prohibition signal is output from the port B1 of the CPU 8. The prohibition signal turns on the transistor TR5 so that the ignition signal is prohibited from being output from the starting ignition signal output circuit 12 and thereafter the operation is returned to the main routine.

Figure 7:
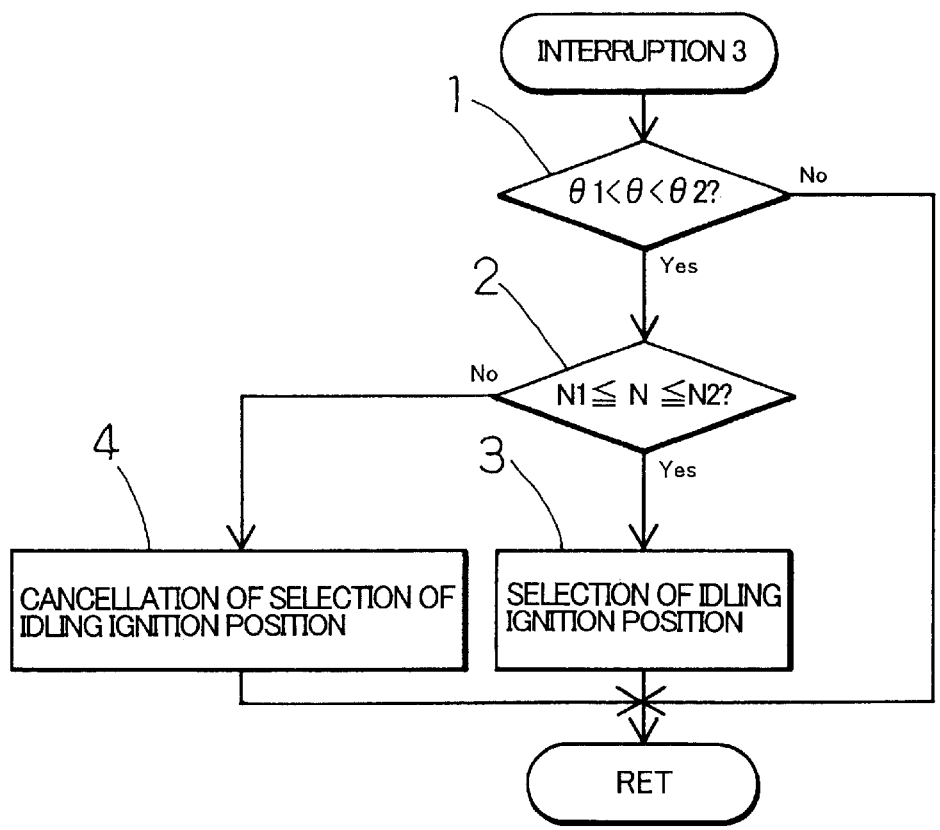
FIG. 7 is a flow chart illustrating an example of an algorithm of an interruption routine of the program practiced by the CPU of the ignition control system of FIG. 1 when a position detection circuit outputs a position detection signal.

As the position detection signal Vs3 is applied from the position detection circuit 11 to the port A3 of the CPU 8, an interruption routine of FIG. 7 is practiced. In the step 1 of this interruption routine, it is judged whether the present rotation angle position θ of the crankshaft of the engine is between the first rotation angle position θ1 and the second rotation angle position θ2 or not. This judgment can be accomplished by seeing whether the second signal Vs2 is generated or not after the first signal Vs1 is generated. As only the first signal Vs1 is generated and the second signal Vs2 is not still generated, it is judged that the present rotation angle position θ of the crankshaft of the engine is between the first rotation angle position θ1 and the second rotation angle position θ2. Otherwise, it is judged that the present rotation angle position θ of the crankshaft of the engine is not between the first rotation angle position θ1 and the second rotation angle position θ2.

As it is judged in the step 1 of the interruption of FIG. 7 that the present rotation angle position θ of the crankshaft of the engine is not between the first rotation angle position θ1 and the second rotation angle position θ2, the operation is returned to the main routine. As it is judged in the step 1 that the present rotation angle position θ of the crankshaft of the engine is between the first rotation angle position θ1 and the second rotation angle position θ2, the operation is advanced to the step 2 where it is judged whether the rotational speed N of the engine is between the first set value N1 and the second set value N2 or not (whether the rotational speed of the engine is in the idling area or not). As the result of the judgment, as it is judged that the rotational speed of the engine is in the idling area, the operation is advanced to the step 3 where the idling ignition position of the engine is selected and the ignition command signal is generated from the port B2 of the CPU 8. This allows the ignition signal to be output from the non-starting ignition signal output circuit 14 and the ignition operation is made at the position (idling ignition position) θ3 where the position detection signal Vs3 is generated between the first rotation angle position θ1 and the second rotation angle θ2. In the step 2, as it is judged that the rotational speed of the engine is not within the idling area, the operation is returned to the main routine without outputting the ignition command signal from the port B2 of the CPU 8 (without selecting the idling ignition position).

The operation of the ignition control system of FIG. 1 is briefed as follows. When the engine should start, since it is judged in the step 1 of the interruption routine of FIG. 6 that the rotational speed of the engine is lower than the first set value, in the step 2 of the same interruption routine, the starting ignition signal is allowed to be output so that the transistor TR5 is kept in the condition of being turned off. Thus, when the second signal Vs2 is generated at the second rotation angle position set at the position suitable for the starting ignition position θ2 (at the position of 2 degrees after the top dead center in the illustrated embodiment), the ignition signal is applied from the second waveform shaping circuit 10 through the starting ignition signal output circuit 12 and the OR circuit 15 to the thyristor Th1 of the ignition circuit 1. This causes the thyristor Th1 to be turned on and therefore the igniting capacitor C1 to be discharged. Thus, the ignition operation is made.

After the internal combustion engine starts, as the rotational speed exceeds the first set value N1, the interruption routine of FIG. 6 prohibits the ignition at the starting ignition position (the second rotation angle position θ2). At that time, in the step 3 of FIG. 7, the CPU 8 is in the mode of selecting the position θ3 where the position detection signal Vs3 is generated for the idling ignition position. At the ignition position, the position detection signal Vs3 is generated and the ignition command signal is output from the port B2 of the CPU 8. Thus, it will be noted that the ignition operation is made in the idling area when the position detection signal Vs3 is generated at the rotation angle position θ3 set between the first rotation angle position θ1 and the second angle position θ2 and suitable for idling (at the position of 10 degrees after the top dead center in the illustrated embodiment).

As the rotational speed of the engine exceeds the second set value N2, in the step 4 of the interruption routine of FIG. 7, the mode of selecting the idling ignition position θ3 is cancelled and, in the step 4 of FIG. 5, the microcomputer starts the mode of controlling the ignition position. Thus, the ignition operation is made at the ignition position arithmetically operated by the main routine of FIG. 4.

The ignition position arithmetically operated by the main routine is determined in the form of a time ΔT (an ignition position determination time) taken for the engine to rotate from the position (the reference position) where the first signal Vs1 is generated to the ignition position. The CPU 8 starts the measurement by setting in the igniting timer of the microcomputer the measurement value of the arithmetically operated ignition position when the generation of the first signal Vs1 is detected and outputs the ignition command signal from the port B2 of the CPU 8 when the igniting timer ends to measure the ignition position.

An example of the characteristic of the ignition position θi relative to the rotational speed N in case that the ignition control system of FIG. 1 is used is shown in FIG. 3.

Although, in the embodiment, the zero cross point of the output of the battery charging generation coil Wg is detected as the peculiar point to generate the position detection signal, the zero cross point of the output of the other generation coil may be detected as the peculiar point to generate the position detection signal. In case that one of the generation coils in the magneto AC generator can be used exclusively for obtaining the information on the rotation angle position of the engine so that the output of the waveform having no substantial variation in the peak position can be obtained from the one generation coil, the position detection circuit may be formed so as to generate the position detection signal whenever the peak position of the output of the one generation coil is detected as the peculiar point.

Although, in the embodiment, the rotational speed N of the engine is arithmetically operated from the distance at which the signal generator device 3 generates the first pulse signal Vp1, the judgment of the rotational speed and the arithmetical operation of the ignition position can be made by using the distance Tn at which the signal generator device 3 generates the pulse signals (the time taken for the engine to rotate one revolution) as variables for providing the rotational speed of the engine without arithmetically operating the rotational speed N.

Although, in the embodiment, the second rotation angle position θ2 where the signal generator device 3 generates the second signal Vp2 is set for the position suitable for the ignition position when the engine should start, the second rotation angle position θ2 where the second signal Vp2 is generated may be set for the position suitable for the idling ignition position and the position where the position detection circuit 11 outputs the position detection signal after the signal generator device 3 outputs the second signal may be set for the position suitable for the starting ignition position when the engine should start. Thus, when the engine should start, the engine is ignited at the position where the position detection circuit generates the position detection signal after the second signal is generated, when the rotational speed of the engine is higher than the first set value and lower than the second set value (when the engine is idling), the engine is ignited at the position where the second signal Vp2 is generated and when the rotational speed of the engine exceeds the second set value, the engine is ignited at the position where the measurement of the arithmetically operated ignition position measurement time ΔT ends.

Figure 8:
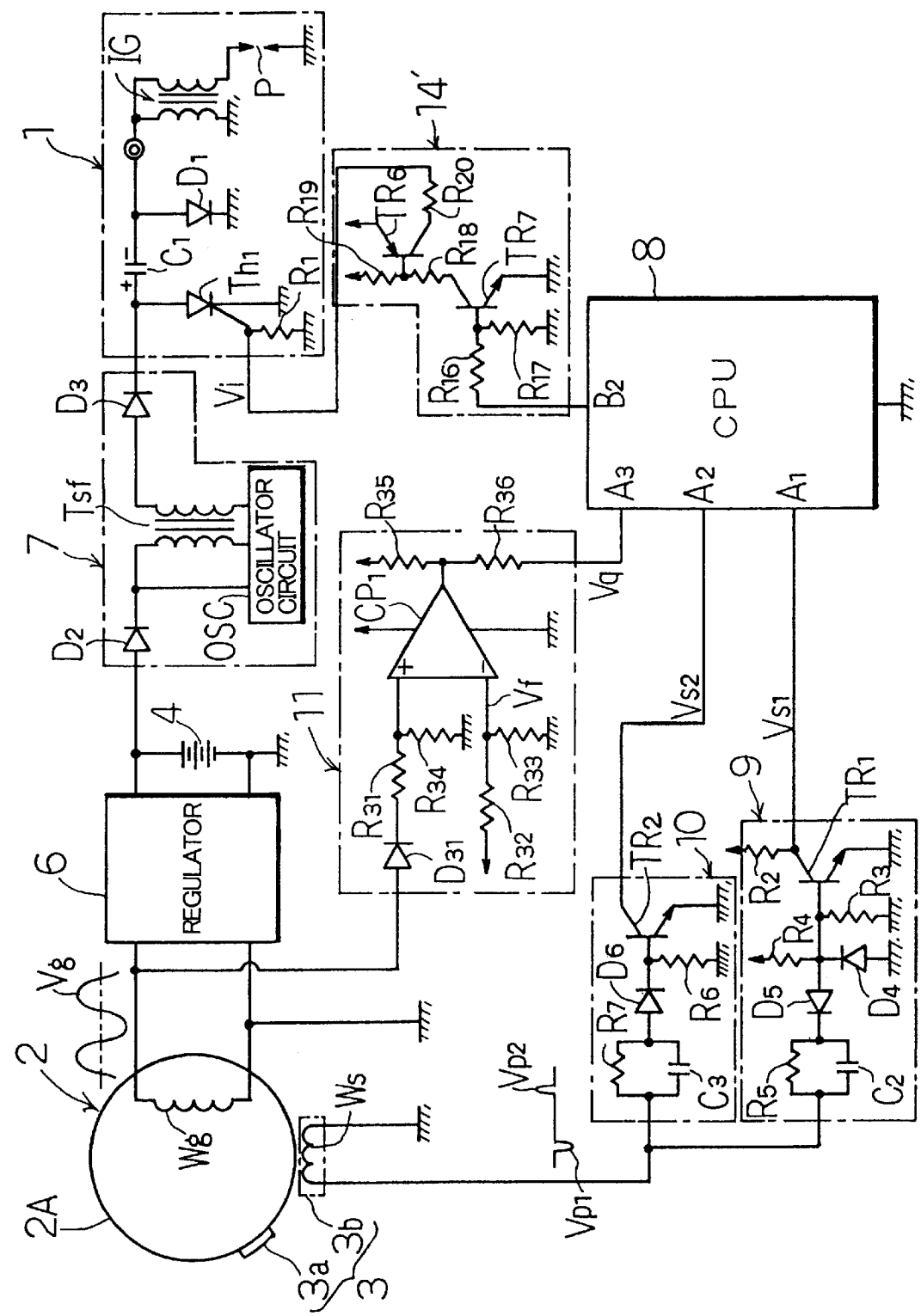
FIG. 8 is a schematic diagram of an ignition control system constructed in accordance with another embodiment of the invention.

An embodiment of the invention in which the position detection circuit 11 is adapted to output the position detection signal after the signal generator device 3 generates the second pulse signal Vp2 is illustrated in FIG. 8.

In the embodiment of FIG. 8, the position detection circuit 11 comprises a comparator CP1, resistors R31 through R36 and a diode D31. In this embodiment, the output voltage of the generation coil Wg is input through the diode D31 and the resistor R31 to a non-inversion input terminal of the comparator CP1 and a set voltage Vf obtained by dividing the battery voltage by a divider circuit forming of the resistors R32 and R33 is input to an inversion input terminal of the comparator CP1. The resistor R34 is connected between the non-inversion input terminal of the comparator CP1 and the earth. The resistors R35 and R36 are connected between the output terminal of the comparator CP1 and the positive terminal of the battery 4 and between the output terminal of the comparator CP1 and the port A3 of the CPU 8. In this embodiment, the starting ignition signal output circuit 12 and the starting ignition signal output prohibition circuit 13 are omitted which are provided in the embodiment of FIG. 1 and the ignition signal is applied through the ignition signal output circuit 14' to the ignition circuit 1 when the CPU 8 generates the ignition command signal from the port B2 thereof. The construction of the ignition signal output circuit 14' is similar to that of the non-starting ignition signal output circuit 14 used in the embodiment of FIG. 1 and the other construction is similar to that of the embodiment of FIG. 1.

A timing chart illustrating the operation of the ignition system of FIG. 8 is shown in FIG. 9. FIG. 9A shows the pulse signals generated by the signal generator device 3, FIG. 9B illustrates the measurement operation of the igniting timer within the CPU 8. FIG. 9C shows the ignition signals Vi applied to the ignition circuit 1 and FIGS. 9D, 9E and 9F show the waveform of the output voltage Vg of the generation coil Wg, the waveform of the position detection signals Vq and Vq' output by the position detection circuit 11 and the waveform of the induction voltage V1 in the primary coil of the ignition coil IG of the ignition circuit 1, respectively. In FIG. 9, the horizontal axis expresses the time t.

In the embodiment of FIG. 8, as shown in FIG. 9E, the output voltage of the comparator CP1 is kept at the low level while the output voltage Vg of the generation coil Wg is less than the set value (the value of the set voltage V1) and at the high level while the output voltage of the generation coil Wg is higher than the set value. In this embodiment, since the magneto AC generator has four poles formed, the generation coil Wg outputs the AV voltage of 2 cycles per one revolution of the engine. The phase relation between the output of the magneto AC generator and the output of the signal generator device 3 is so set that the position detection circuit 11 sequentially generates the position detection signals Vq and Vq' after the signal generator device 3 generates the second pulse signal Vp2. In FIG. 9E, "Vq" indicates the first position detection signal generated after the signal generator device 3 generates the second pulse signal Vp2 while "Vq'" indicates the second position detection signal generated after the signal generator device 3 generates the second pulse signal Vp2.

In the embodiment of FIG. 9, the first set value of the rotational speed of the engine is 1000 rpm and the area where the rotational speed is lower than the first set value is set as the lowest speed area. The second set value of the rotational speed value of the engine is 2000 rpm and the area where the rotational speed is 1000 rpn to 2000 rpm is set as the low speed area.

While the rotational speed is lower than the first set value of 1000 rpm, the CPU 8 generates the ignition command signal when the first position detection signal is generated at the time t1 after the second pulse signal Vp2 is generated. Thus, as shown in FIG. 9C, in the rotational speed area of less than the first set value, the ignition signal Vi is applied to the ignition circuit 1 when the position detection signal Vq is generated and the igniting capacitor Cl is discharged. At that time, the voltage V1 is induced across the primary coil of the ignition coil IG and igniting high voltage is induced across the secondary coil of the ignition coil IG so that the ignition operation of the engine is made. The CPU 8 never generates the ignition command signal when the second position detection signal Vq' is generated after the second pulse signal Vp2 is generated.

In the low speed area (the idling area) of the rotational speed of the engine from the first set value of 1000 rpm to the second set value of 2000 rpm, the CPU 8 generates the ignition command signal when the second pulse signal Vp2 is generated at the time t2. Thus, in this area, the ignition signal Vi is applied to the ignition circuit 1 when the second pulse signal Vp2 is generated at the time t2 and the ignition operation is made. After the ignition command signal is generated at the time t2, the position detection signal Vq is generated, but the CPU 8 never outputs the ignition command signal even though it recognizes the position detection signal.

In the rotational speed area of more than 2000 rpm, as shown in the most rightward portion of FIG. 9, the ignition signal Vi is applied to the ignition circuit 1 at the time t3 when the igniting timer in the CPU 8 ends to measure the arithmetically operated ignition position measurement time ΔT and the ignition operation is made. At that time, the CPU 8 prohibits the output of the ignition command signal by the second pulse signal Vp2 and the position detection signal Vs3.

As aforementioned, in the embodiment of FIG. 8, in the rotational speed area of less than the first set value, the ignition operation is made when the output voltage of the generation coil reaches the set value Vf and the position detection signal Vq is generated. Since the phase in which the output voltage of the generation coil reaches the set value Vf is advanced as the peak value of the output voltage of the generation coil increases with the increase in the rotational speed, the time when the position detection signal Vq rises is advanced as the rotational speed increases.

Figures 10A, 10B, 10C, 10D, 10E:
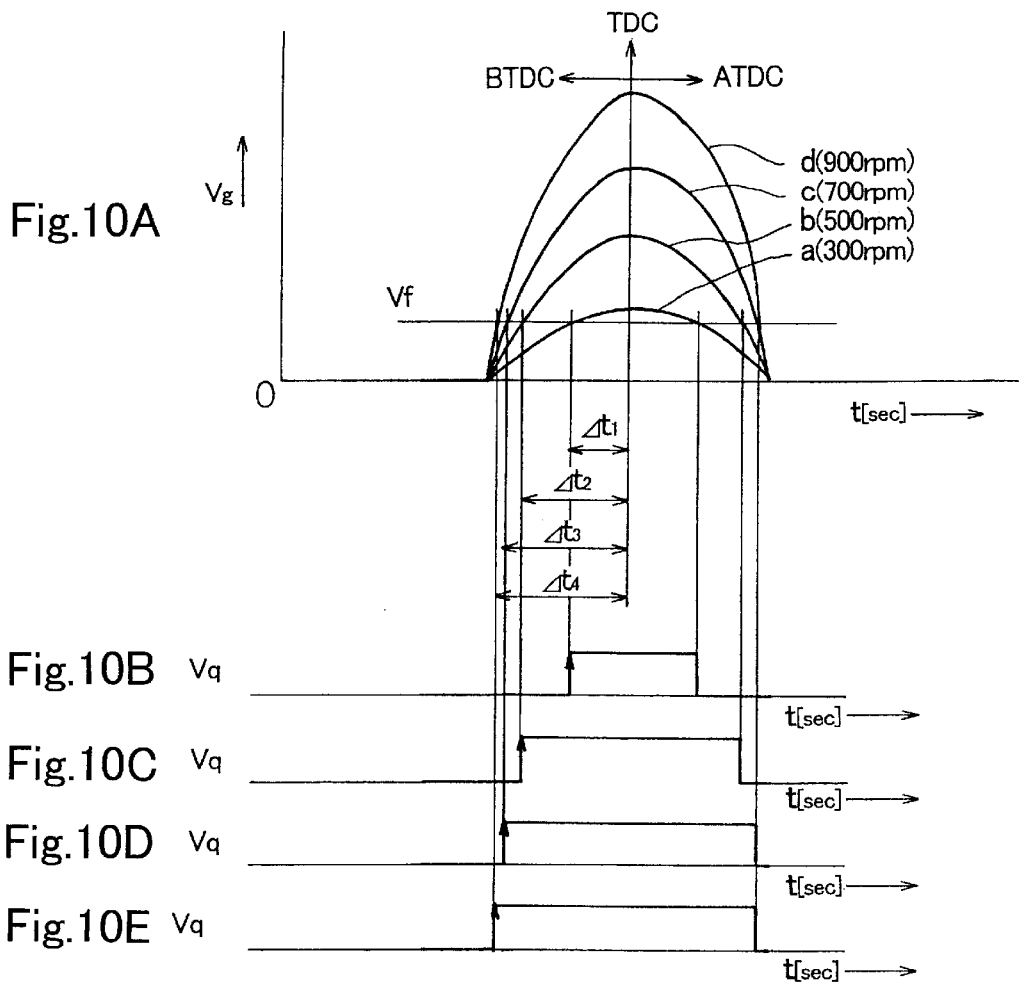
FIGS. 10A through 10E illustrate half wave forms of output voltages generated by a generation coil of the ignition control system of FIG. 8 and a position detection signal generated by the position detection circuit with a rotational speed of the engine taken as a parameter.

FIG. 10A shows the waveforms of the output voltage Vg of the generation coil for various values of the rotational speed. In this figure, "a" through "d" indicate the waveforms of the output voltage Vg of the generator relative to the rotational speeds of 300 rpm, 500 rpm, 700 rpm and 900 rpm, respectively. Since the position detection circuit 11 outputs the position detection signals Vq while these voltages get more than the set voltage Vf, the waveforms of the position detection signals output by the position detection circuit 11 relative to the respective rotational speeds of 300 rpm, 500 rpm, 700 rpm and 900 rpm are as shown in FIGS. 10B through 10E, respectively.

In the embodiment of FIG. 10, the position where the stator of the magneto AC generator is mounted is so set as that the output voltage Vg of the generation coil Wg reaches the peak at the top dead center TDC of the engine. In FIG. 10, "BTDC" indicates the area advanced relative to the top dead center of the engine while "ATDC" indicates the area delayed relative to the top dead center of the engine.

As aforementioned, since the time when the position detection signal Vq is generated is advanced as the rotational speed increases, in the lowest rotational speed area of less than the first set value, the ignition position gets gradually advanced as the rotational speed of the engine increases and gets finally closer to the ignition position in the low speed area falling within the range from the first set value to the second set value. Accordingly, such characteristic of the ignition system of FIG. 8 is obtained that, in the lowest rotational speed area of less than the first set value N1, the ignition time (the time corresponding to the ignition position) ti gets advanced, in the low rotational speed area of the first set value N1 to the second set value N2, the ignition time ti gets constant and in the middle or high rotational speed area of more than the second set value N2, the ignition time gets advanced.

Figure 11:
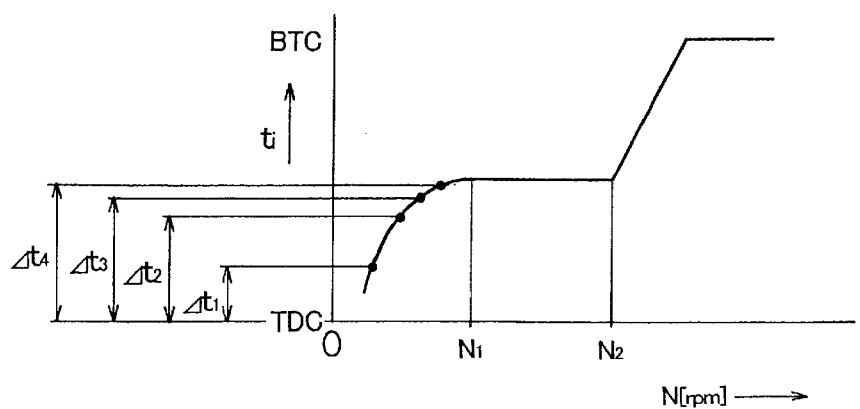
FIG. 11 illustrates an example of the ignition characteristic obtained by the ignition control system of FIG. 8.

In the characteristic of FIG. 11, kicking back when the engine should start can be prevented by the fully smaller amount of advance of the ignition time Δti and the engine can idle in a steady manner by setting the fixed ignition position at an appropriate time.

As the ignition time is advanced at the lowest rotational speed so that it is closer to the ignition time in the low rotational speed area as shown in FIG. 11, the rotation of the engine can be made more stably than that in case that the ignition time is advanced in a stepped manner when the rotational speed enters the low rotational speed area from the lowest rotational speed area.

Although, in the embodiment of FIG. 11, the ignition time is linearly advanced in the middle and high rotational speed area exceeding the second set value N2, the ignition time (the ignition position) in the rotational speed area exceeding the second set value N2 is determined on the ignition position measurement time ΔT arithmetically operated by the CPU 8 and therefore the ignition characteristic in the rotational speed area exceeding the second set value N2 varies on the content of the arithmetical operation by the CPU 8 (on the requirements from the engine).

Figure 12:
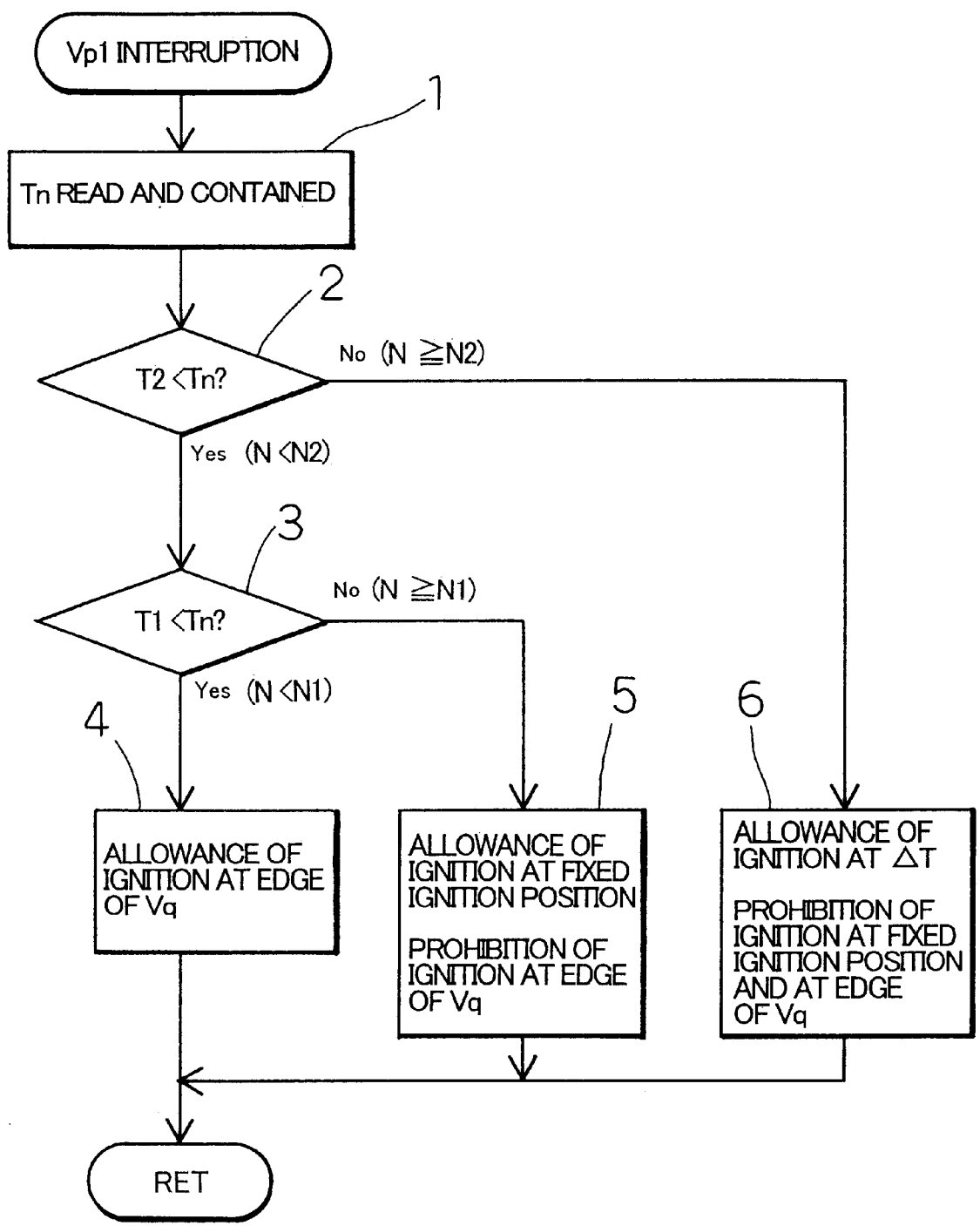
FIG. 12 is a flow chart illustrating an example of an algorithm of an interruption routine of the program practiced by the CPU of the ignition control system of FIG. 8 when the signal generator device outputs the first pulse signal.
Figure 13:
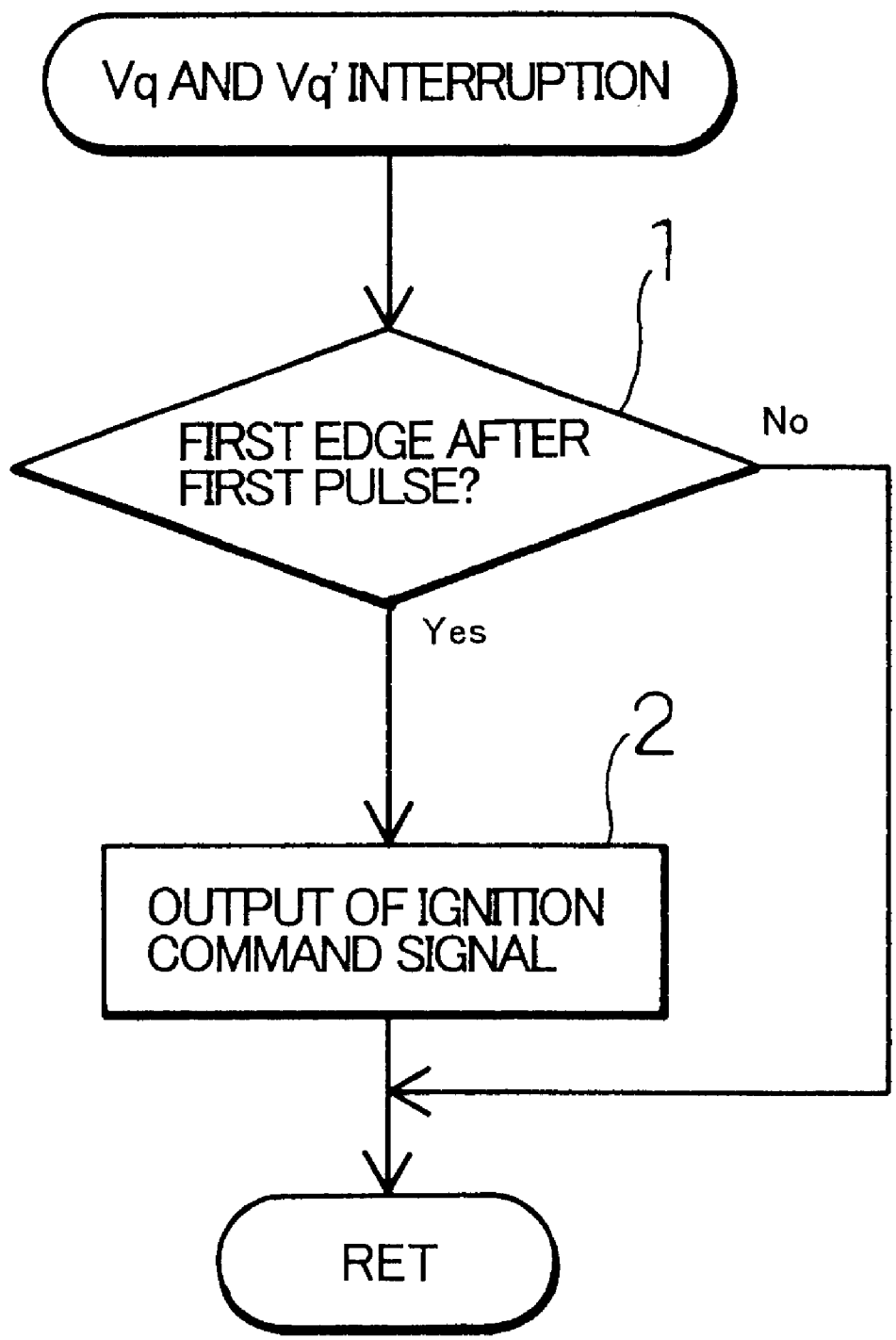
FIG. 13 is a flow chart illustrating an example of an algorithm of an interruption routine of the program practiced by the CPU of the ignition control system of FIG. 8 when the position detection circuit outputs the position detection signal.

In the ignition system of FIG. 8, flow charts indicating an example of the algorithm of the program practiced by the CPU 8 are shown in FIGS. 12 and 13.

FIG. 12 shows an interruption routine practiced whenever the signal generator device generates the first pulse signal Vp1. In the step 1 of the interruption routine, the time Tn from the time when the previous first pulse signal is generated to the time when the present second pulse signal is generated (the time taken for the engine to rotate one revolution) is read and the read time Tn is contained in the RAM. Then, in the step 2, the time Tn is compared with the time T2 corresponding to the second set value N2 of the rotational speed. As the result of the comparison, when the time T2 is less than the time Tn (the set value N is less than the second set value N2), the operation is advanced to the step 3 where it is judged whether the time Tn exceeds the value T1 corresponding to the first set value N1 of the rotational speed (N is less than N1) or not. As the result, when Tn is more than T1, the operation is advanced to the step 4 where the engine is allowed to be ignited at the rising edge of the position detection signal Vq and the operation is returned to the main routine. The construction of the main routine is similar to that of FIG. 4. In the step 3, when it is judged that Tn is equal to or less than T1 (N is equal to or more than N1), the operation is returned to the step 5 where the engine is allowed to be ignited at the position where the second pulse signal Vp2 is generated (the fixed ignition position) and the engine is prohibited from being ignited at the rising edge of the position detection signal Vq and then the operation is returned to the main routine.

In the step 2 of FIG. 12, when it is judged that T2 is equal to or more than Tn (N is equal to or more than N2), the operation is advanced to the step 6 where the ignition position is allowed to be determined on the arithmetically operated ignition position measurement time ΔT and the ignition at the fixed ignition position (the position where the second pulse signal is generated) and at the rising edge of the position detection signal Vq are prohibited and then the operation is returned to the main routine.

In the condition that the ignition is allowed at the rising edge of the position detection signal Vq in the step 4 of FIG. 12, an interruption routine of FIG. 13 is practiced when the CPU 8 recognizes the rising edges of the position detection signals Vq and Vq'. In the step 1 of the interruption routine of FIG. 13, it is judged whether the rising edge of the position detection signal recognized by the CPU 8 is the first edge recognized after the first pulse signal Vp1 is generated or not (whether it is the first position detection signal Vq or not). When it is the first edge, the operation is advanced to the step 2 where the ignition command signal is output. In the step 1, when it is judged that it is not the first edge, nothing is done (no ignition command signal is generated at the rising edge of the position detection signal Vq') and the operation is returned to the main routine.

Figure 14:
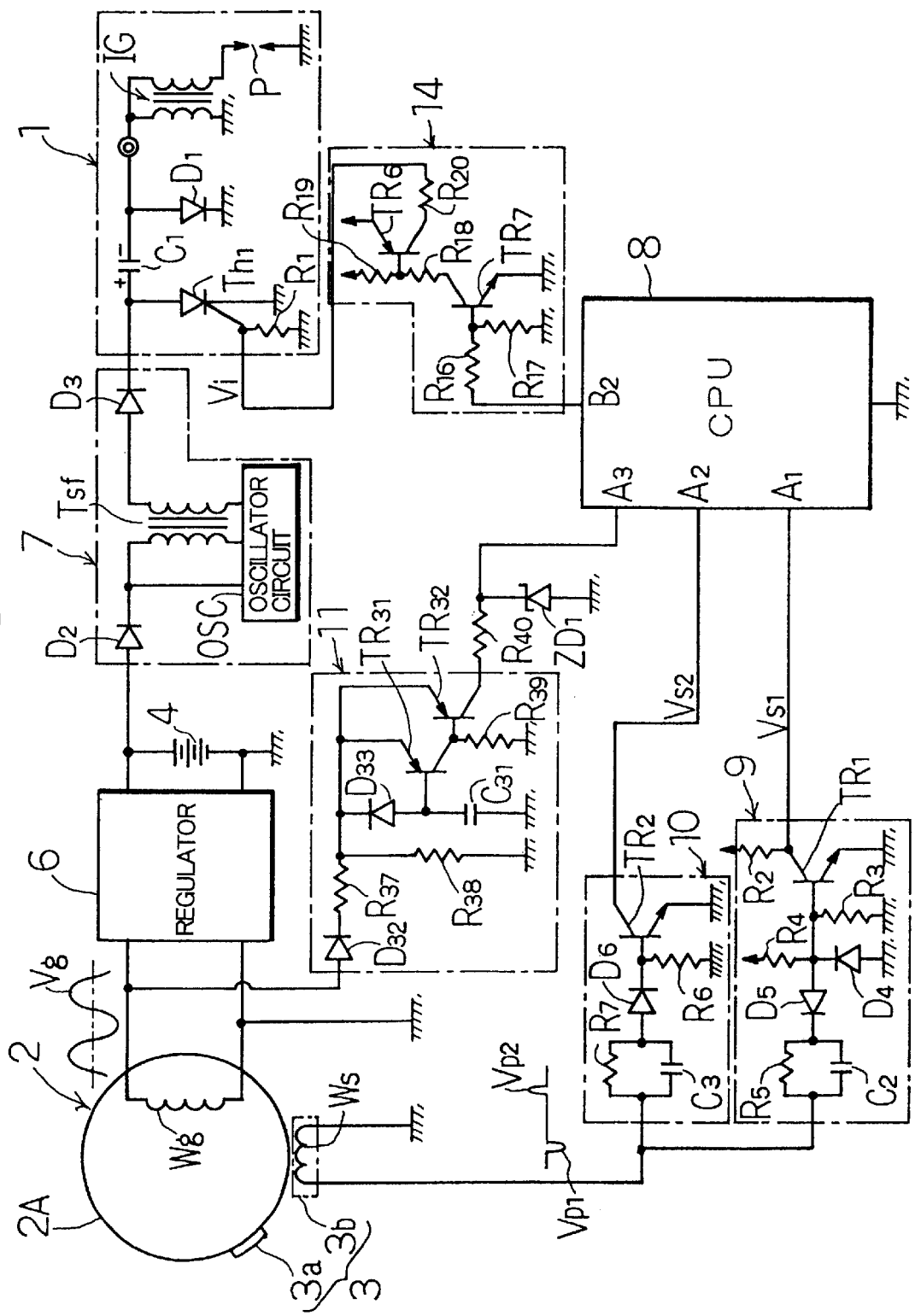
FIG. 14 is a schematic diagram of an ignition control system constructed in accordance with further embodiment of the invention.

FIG. 14 illustrates another embodiment of the ignition system in which the ignition position when the engine should start is determined on the position detection signal. In the embodiment, the position detection circuit 11 comprises a peak detection circuit to detect the peak point of the output voltage of the generation coil Wg as the peculiar or specific point. The output of the position detection circuit 11 is input through a resistor R40 to the port A3 of the CPU 8. In order to limit the voltage input to the port of the CPU 8, a Zenor diode ZD1 is connected between the port A3 and the earth.

The position detection circuit 11 of FIG. 14 comprises PNP transistors TR31 and TR32, diodes D32 and D33, resistors R37 through R39 and a capacitor C31. In the peak detection circuit, when the generation coil Wg generates the voltage of positive half cycle, the current flows through the diode D32, the resistor R37, the emitter and the base of the transistor TR31 and the capacitor C31, which causes the transistor TR31 to be turned on. While the transistor TR31 is in the on-state, the transistor TR32 is kept in the off-state, no position detection signal is generated. Since no charging current flows through the capacitor C31 as the output voltage of positive half cycle of the generation coil Wg reaches the peak, the transistor TR31 gets turned off. As the transistor TR31 gets turned off, the base current flows through the transistor TR32, which causes the transistor TR32 to be turned on. Thus, the position detection circuit 11 generates the output signal.

In general, the peak detection circuit may comprise a capacitor charged by the voltage of one half cycle of the generation coil, a switch element kept in the on-state by a drive signal while the charging current flows through the capacitor and a circuit to generate an output signal when the switch element is changed from the on-state to the off-state, but it may be limited to the embodiment of FIG. 14.

In the ignition system of FIG. 14, the waveform of the position detection signal Vs output by the position detection circuit 11 of the ignition system of FIG. 14 is shown in FIG. 15C. FIGS. 15A and 15B show the waveforms of the pulse signals Vp1 and Vp2 output by the signal generator device and the waveforms of the voltage Vg of positive half cycle output by the generation coil Wg of the magneto AC generator, respectively. The CPU 8 generates the ignition command signal at the rising up of the first position detection signal Vs after the second pulse signal Vp2 is generated when the rotational speed of the engine is less than the first set value N1. The ignition command signal causes the ignition signal Vi to be applied to the ignition system as shown in FIG. 15D. In FIGS. 15B and 15C, the solid line waveforms indicate ones when the rotational speed of the engine is one value lower than the first set value while the dotted line waveforms indicate ones in the rotational speed further lower than the one at which the solid line waveforms are obtained. As apparent from these figures, the peak position of the output voltage of the generation coil is kept generally at the constant position even though the rotational speed varies. In the embodiment, the voltage of positive half cycle is so set to reach the peak at the position slightly delayed relative to the top dead center TDC of the engine.

According to the ignition system of FIG. 14, as shown in FIG. 16, when the rotational speed is less than the first set value, the ignition is made at the position slightly delayed relative to the top dead center TDC (the position where the position detection signal Vs is generated) and in the rotational speed area from the first set value N1 to the second set value N2, the ignition is made at the position where the second pulse signal Vp2 is generated. In the rotational speed area exceeding the second set value N2, the engine is ignited at the ignition position arithmetically operated by the CPU 8. In this embodiment, the kicking back when the engine should start can be prevented by properly setting the peak position of the output voltage of positive half cycle of the generation coil Wg and the rotation of the engine in the low speed area such as the idling area can be stably made by properly setting the generation position of the second pulse signal Vp2.

Although, in the embodiment of FIG. 14, the ignition signal is applied through the ignition signal output circuit 14 to the ignition circuit 1 when the CPU 8 recognizes the output signal of the position detection circuit 11, the ignition signal may be applied through the OR circuit 15 to the ignition circuit 1 when the position detection circuit 11 generates the position detection signal. An example of the construction of the ignition system in which the ignition signal is applied to the ignition circuit 1 from the position detection circuit 11 in the form of the peak detection circuit through the OR circuit 15 is illustrated in FIG. 17.

Figure 17:
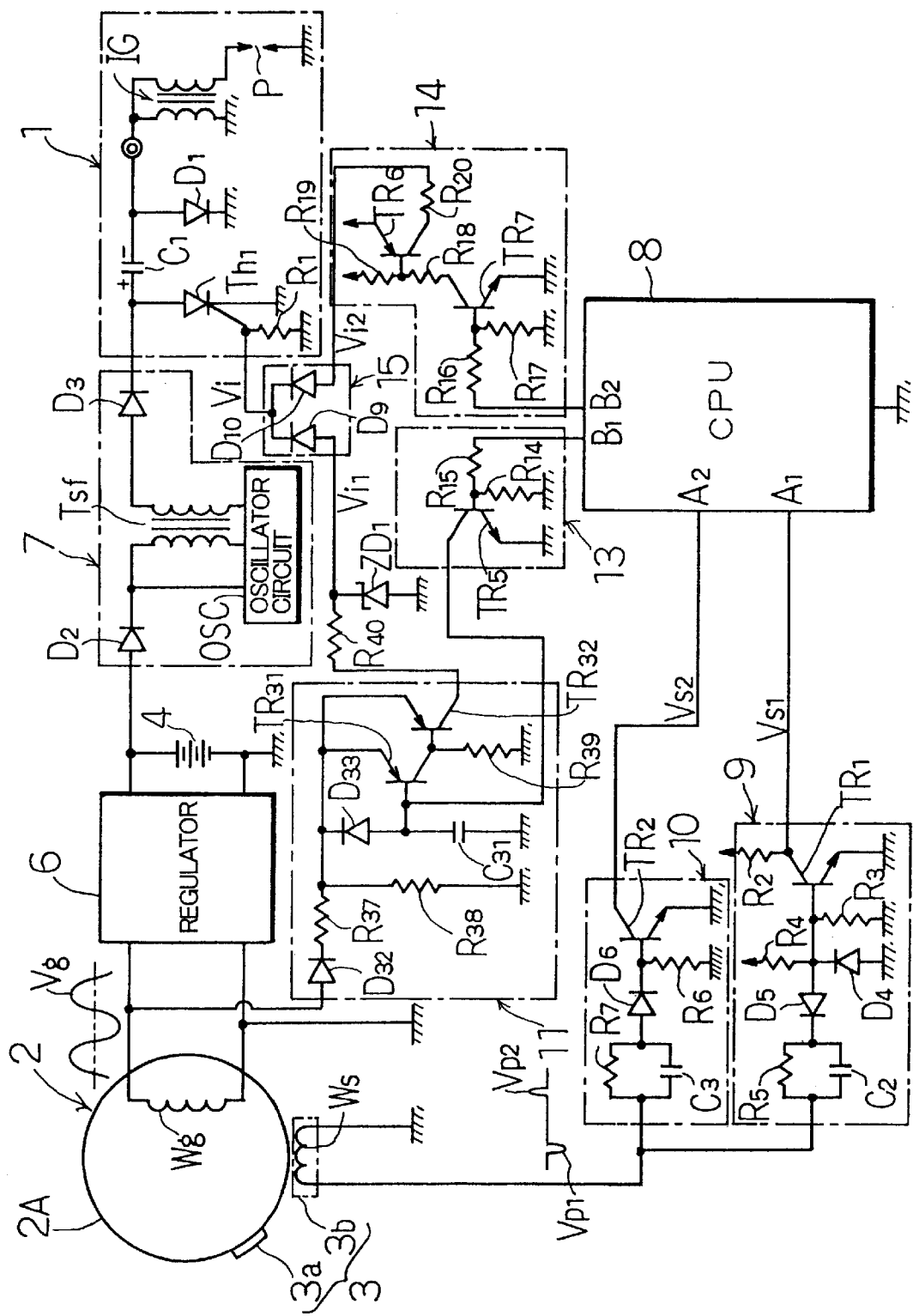
FIG. 17 is a schematic diagram of an ignition control system constructed in accordance with further embodiment of the invention.

The construction of the ignition system of FIG. 17 is substantially identical to that of FIG. 1 except that the position detection circuit 11 comprises the peak detection circuit, that the position detection circuit 11 generates the position detection signal at a position delayed to the position where the second pulse signal Vp2 is generated, that the starting ignition signal output circuit 12 of FIG. 1 is omitted and that the collector of the transistor TR5 of the starting ignition signal output prohibition circuit 13 is connected to the non-grounded terminal of the capacitor C31 of the peak detection circuit.

With the construction illustrated in FIG. 17, the prohibition signal is output from the port B1 of the CPU 8 when the rotational speed of the engine exceeds the first set value. At that time, since the starting ignition signal output prohibition circuit 13 shorts the capacitor C31 of the peak detection circuit, the transistor TR31 is kept in the on-state while the transistor TR32 is kept in the off-state. Accordingly, in the condition that the rotational speed of the engine exceeds the first set value, the ignition signal Vi1 applied from the position detection circuit 11 to the OR circuit 15 is kept at zero as shown in FIG. 18D.

Although, in the ignition control systems of FIGS. 14 and 17, the position detection circuit 11 is formed of the peak detection circuit, it may be formed of a zero cross detection circuit.

Although, in the aforementioned embodiments, the ignition circuit comprises the capacitor discharging circuit, it may comprise a current interruption type circuit.

The preferred embodiments of the invention are described in details, but the ignition control method and the ignition control system of the invention will be briefed as follows.

In the ignition control method of the invention, there are provided the signal generator device to generate a first pulse signal at the first rotation angle position set at the position advanced relative to the top dead center of the internal combustion engine and a second pulse signal at the second rotation angle position set at the position delayed relative to the first rotation angle position and the position detection circuit to output the position detection signal whenever the peculiar or specific point of the output waveform from the generation coil of the magneto AC generator driven by the engine and the phase relation between the output of the signal generator device and the output of the generation coil is so set as that the position detection signal is generated at least once between the first and second rotation angle positions whereby the ignition position of the engine is so controlled that while the rotational speed of the engine is lower than the set value, the engine is ignited when one signal selected among the second pulse signal and the position detection signal and while the rotational speed of the engine exceeds the set value, the engine is ignited at the rotation angle position arithmetically operated from the control conditions including the rotational speed of the internal combustion engine.

Although the appropriate ignition positions on the start of the internal combustion engine and at the low speed thereof vary on the kind of the engine, the ordinary engine is so set that when the engine should start or while the rotational speed of the engine is lower than the first set value, the engine is ignited at the position fully delayed adjacent to the top dead center of the engine and while the rotational speed of the engine is higher than the first set value and lower than the second set value (in the idling area), the engine is ignited at the position advanced relative to the starting ignition position.

In case that the invention is applied to such an internal combustion engine, when the engine should start or while the rotational speed of the engine is lower than the first set value, the engine is ignited as the signal generator device generates the second pulse signal, while the rotational speed of the engine is higher than the first set value and lower than the second set value, the engine is ignited as the position detection circuit generates the position detection signal between the first and second rotation angle positions and while the internal combustion engine rotates at the rotational speed exceeding the second set value, the engine is ignited at the rotation angle position arithmetically operated from the control conditions including the rotational speed of the internal combustion engine.

With the construction aforementioned, since the engine can be ignited at the generation position of the second pulse signal fully delayed relative to the top dead center when the engine should start and while it rotates at the lowest rotational speed, the phenomena in which the piston is forced back on the start of the engine can be prevented. In case that the rotational speed is within the scope between the first and second set values after engine starts, since the engine can be ignited at the generation position of the position detection signal advanced relative to the second pulse signal, the engine can rotate stably at the low speed.

The ignition control system for the internal combustion engine according to the invention comprises low speed ignition control means to control the ignition position of the engine so that it is ignited when it is detected that the rotation angle position is coincident with the peculiar or specific rotation angle position predetermined in accordance with the rotational speed and steady-state ignition control means to control the ignition position of the engine so that it is ignited when the ignition position arithmetically operated from the control conditions including at least the rotational speed of the engine whereby the ignition position of the engine is determined by the low speed ignition position control means when the engine should start or while the rotational speed of the engine is equal to or less than the set value and the ignition position of the engine is determined by the steady-state ignition position control means when the rotational speed of the engine exceeds the set value.

The invention is provided with the signal generator device to generate the first pulse signal at the first rotation angle position set at the position advanced relative to the top dead center of the internal combustion engine and the second pulse signal at the second rotation angle position delayed relative to the first rotation angle position and the position detection circuit to output the position detection signal whenever the peculiar point of the waveform of the output from the generation coil of the magneto AC generator driven by the engine and the phase relation between the output of the signal generator device and the output of the generation coil is so set that the position detection signal is generated at least once between the first and second rotation angle positions.

The low speed ignition position control means is so constructed to ignite the engine as the signal generator device generates the second pulse signal when the engine should start or while the rotational speed of the engine is lower than the first set value and to ignite the engine as the position detection circuit generates the position detection signal between the first and second rotation angle positions while the rotational speed of the internal combustion engine is equal to or more than the first set value and equal to or less than the second set value.

The steady-state ignition position control means is so constructed as to ignite the engine at the arithmetically operated ignition position when the rotational speed of the engine exceeds the second set value.

Instead of the signal generator device generating the second pulse signal at the position suitable for the starting ignition position, the position detection circuit to detect the peculiar point of the output waveform of the generation coil in the magneto AC generator may output the position detection signal for detecting the rotation angle position suitable for starting the engine.

More particularly, the invention is provided with the signal generator device to generate the first pulse signal at the first rotation angle position set at the position advanced relative to the top dead center of the internal combustion engine and the second pulse signal at the second rotation angle position set at the position delayed relative to the first rotation angle position and the position detection circuit to output the position detection signal whenever the peculiar point of the output waveform from the generation coil of the magneto AC generator driven by the engine is detected and the phase relation between the output of the signal generator device and the output of the generation coil is so set as that the position detection signal is generated after the second pulse signal is generated whereby when the engine should start or while the rotational speed of the engine is lower than the set value, the engine is ignited as the position detection signal is generated when the rotational speed of the engine is within the scope between the first set value and the second set value which is higher than the first set value and the engine is ignited at the rotation angle position arithmetically operated from the control conditions including the rotational speed of the internal combustion engine when it exceeds the second set value.

The zero cross detection circuit or the peak detection circuit may be used as the position detection circuit.

In case that the position where the position detection signal is generated after the signal generator device generates the second pulse signal is determined as the ignition position when the engine should start or while the rotational speed of the engine is less than the first set value, the position detection circuit may be so constructed as to output the position detection signal whenever the output voltage of one polarity of the generation coil reaches the constant set value.

The position where the output voltage of the generation coil reaches the constant set value (the rotation angle position of the crankshaft) is advanced as the peak value of the output voltage of the generation coil increases with the increase in the rotational speed of the engine. Thus, in case that the position detection circuit is so constructed that the position detection signal is detected whenever the output voltage of one polarity of the generation coil reaches the constant set value, the ignition position is gradually advanced in the rotational speed area lower than the first set value (the lowest speed area) and closer to the ignition position in the low rotational speed area (idling area) falling within the scope from the first set value to the second set value. Thus, the operation of the engine at the low speed can be made more stably than in case that the ignition position is advanced in a stepped manner when the rotational speed enters the low sped area from the lowest speed area.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. An ignition control method for an internal combustion engine comprising a signal generator device to generate a first pulse signal at a first rotation angle position set at a position advanced relative to a top dead center of said internal combustion engine and a second pulse signal at a second rotation angle position set at a position delayed relative to said first rotation angle position and a position detection circuit to output a position detection signal whenever a peculiar point of a waveform of an output from a generation coil of a magneto AC generator driven by said engine and a phase relation between an output of said signal generator device and an output of said generation coil so set as that said position detection signal is generated at least once between said first and second rotation angle positions whereby an ignition position of said engine is so controlled that when said engine should start or while a rotational speed of said engine is lower than a set value, said engine is ignited as one signal selected among said second pulse signal and said position detection signal is generated and while said rotational speed of said engine exceeds said set value, said engine is ignited at a rotation angle position arithmetically operated from control conditions including said rotational speed of said internal combustion engine.

2. An ignition control method for an internal combustion engine comprising a signal generator device to generate a first pulse signal at a first rotation angle position set at a position advanced relative to a top dead center of said internal combustion engine and a second pulse signal at a second rotation angle position set at a position delayed relative to said first rotation angle position and a position detection circuit to output said position detection signal whenever a peculiar point of a waveform of an output from a generation coil of a magneto AC generator driven by said engine and a phase relation between an output of said signal generator device and an output of said generation coil so set as that said position detection signal is generated at least once between said first and second rotation angle positions whereby an ignition position of said engine is so controlled that when said engine should start or while a rotational speed of said engine is lower than a first set value, said engine is ignited as said signal generator device outputs said second pulse signal, while said rotational speed of said engine is within a scope from said first set value to a second set value higher than said first set value, said engine is ignited as said position detection circuit detects said position detection signal between said first and second rotation angle positions and while said rotational speed of said engine exceeds said second set value, said engine is ignited at a rotation angle position arithmetically operated from control conditions including said rotational speed of said internal combustion engine.

3. An ignition control system for an internal combustion engine comprising low speed ignition position control means to control an ignition position of said internal combustion engine so as to ignite said engine when it is detected that a rotation angle position of said engine is consistent with a peculiar rotation angle position predetermined in accordance with a rotational speed of said engine and steady-state ignition position control means to control said ignition position so as to ignite said engine when an ignition position arithmetically operated from control conditions including at least a rotational speed of said internal combustion engine is detected whereby said ignition position of said engine is determined by said low speed ignition position control means when said engine should start or while said engine rotates at a rotational speed of a set value or less than and by said steady-state ignition position control means while said engine rotates at a rotational speed exceeding said set value, said ignition control system further comprising a signal generator device to generate a first pulse signal at a first rotation angle position set at a position advanced relative to a top dead center of said engine and a second pulse signal at a second rotation angle position set at a position delayed relative to said first rotation angle position and a position detection circuit to output a position detection signal whenever a peculiar point of waveform of an output from a generation coil provided in a magneto AC generator driven by said engine and a phase relation between the output of said signal generator device and the output of said generation coil so set that said position detection signal is generated at least once between said first and second rotation angle positions, said low speed ignition position control means so constructed that when said engine should start or while a rotational speed of said engine is lower than a first set value, said engine is ignited as said signal generator device outputs said second pulse signal and while said rotational speed of said engine is within a scope from said first set value to a second set value higher than said first set value, said engine is ignited as said position detection circuit detects said position detection signal between said first and second rotation angle positions and said steady-state ignition position control means so constructed that while said rotational speed of said engine exceeds said second set value, said engine is ignited at a rotation angle position arithmetically operated from control conditions including said rotational speed of said internal combustion engine.

4. An ignition control system for an internal combustion engine as set forth in claim 3 and wherein said position detection circuit comprises a zero cross detection circuit to detect a zero cross point of a waveform of an output from said generation coil as said peculiar point.

5. An ignition control system for an internal combustion engine as set forth in claim 3 and wherein said position detection circuit comprises a peak detection circuit to detect a peak point of the waveform of the output from said generation coil as said peculiar point.

6. An ignition control method for an internal combustion engine comprising a signal generator device to generate a first pulse signal at a first rotation angle position set at a position advanced relative to a top dead center of said internal combustion engine and a second pulse signal at a second rotation angle position set at a position delayed relative to said first rotation angle position and a position detection circuit to output said position detection signal whenever a peculiar point of a waveform of an output from a generation coil of a magneto AC generator driven by said engine and a phase relation between an output of said signal generator device and an output of said generation coil so set as that said position detection signal is generated after said second pulse signal is generated whereby an ignition position of said engine is so controlled that when said engine should start or while a rotational speed of said engine is lower than a first set value, said engine is ignited as said position detection signal is generated, while said rotational speed of said engine is within a scope from said first set value to a second set value higher than said first set value, said engine is ignited as said second pulse signal is generated and while said rotational speed of said engine exceeds said second set value, said engine is ignited at a rotation angle position arithmetically operated from control conditions including said rotational speed of said internal combustion engine.

7. An ignition control system for an internal combustion engine comprising low speed ignition position control means to control an ignition position of said internal combustion engine so as to ignite said engine when it is detected that a rotation angle position of said engine is consistent with a specific rotation angle position and steady-state ignition position control means to control said ignition position so as to ignite said engine when an ignition position arithmetically operated from control conditions including at least a rotational speed of said internal combustion engine is detected whereby said ignition position of said engine is determined by said low speed ignition position control means when said engine should start or while said engine rotates at a rotational speed of a set value or less than and by said steady-state ignition position control means while said engine rotates at a rotational speed exceeding said set value, said ignition control system further comprising a signal generator device to generate a first pulse signal at a first rotation angle position set at a position advanced relative to a top dead center of said engine and a second pulse signal at a second rotation angle position set at a delayed relative to said first rotation angle position and a position detection circuit to output a position detection signal whenever a peculiar point of a waveform of an output from a generation coil provided in a magneto AC generator driven by said engine and a phase relation between the output of said signal generator device and the output of said generation coil so set that said position detection signal is generated at a position delayed relative to said second rotation angle position, said low speed ignition position control means so constructed that when said engine should start or while said rotational speed of said engine is lower than a first set value, said engine is ignited as said position detection signal is generated and while said rotational speed of said engine is within a scope from said first set value to a second set value higher than said first set value, said engine is ignited as said signal generator device generates said second pulse signal and said steady-state ignition position control means so constructed that while said rotational speed of said engine exceeds said second set value, said engine is ignited at said arithmetically operated ignition position.

8. An ignition control system for an internal combustion engine as set forth in claim 7 and wherein said position detection circuit comprises a zero cross detection circuit to detect a zero cross point of a waveform of an output of said generation coil as said peculiar point.

9. An ignition control system for an internal combustion engine as set forth in claim 7 and wherein said position detection circuit comprises a peak detection circuit to detect a peak point of the waveform of the output of said generation coil as said peculiar point.

10. An ignition control system for an internal combustion engine comprising low speed ignition position control means to control an ignition position of said internal combustion engine so as to ignite said engine when it is detected that a rotation angle position of said engine is consistent with a specific rotation angle position and steady-state ignition position control means to control said ignition position so as to ignite said engine when an ignition position arithmetically operated from control conditions including at least a rotational speed of said internal combustion engine is detected whereby said ignition position of said engine is determined by said low speed ignition position control means when said engine should start or while said engine rotates at the rotational speed of a set value or less than and by said steady-state ignition position control means while said engine rotates at the rotational speed exceeding said set value, said ignition control system further comprising a signal generator device to generate a first pulse signal at a first rotation angle position set at a position advanced relative to a top dead center of said engine and a second pulse signal at a second rotation angle position set at a position delayed relative to said first rotation angle position and a position detection circuit to output a position detection signal whenever an output voltage of one polarity of a generation coil provided in a magneto AC generator driven by said engine reaches a set value and a phase relation between the output of said signal generator device and the output of said generation coil so set that said position detection signal is generated at a position delayed relative to said second rotation angle position, said low speed ignition position control means so constructed that when said engine should start or while a rotational speed of said engine is lower than a first set value, said engine is ignited as said position detection signal is generated and while said rotational speed of said engine is within a scope from said first set value to a second set value higher than said first set value, said engine is ignited as said signal generator device generates said second pulse signal and said steady-state ignition position control means so constructed that while said rotational speed of said engine exceeds said second set value, said engine is ignited at said arithmetically operated ignition position.

\* \* \* \* \*